US011956875B1

(12) United States Patent
Hume et al.

(10) Patent No.: US 11,956,875 B1
(45) **Date of Patent: *Apr. 9, 2024**

(54) DC POWER MANAGEMENT SYSTEM

(71) Applicant: Southwire Company, LLC, Carrollton, GA (US)

(72) Inventors: Charles Hume, Parrish, FL (US); David Sykes, Pinellas Park, FL (US); Aldo P. Della Sera, Saint Petersburg, FL (US); Juan Galindo, Powder Springs, GA (US); Andrew M. Pluister, Lake Barrington, IL (US); Mark Crosier, Ipswich (GB)

(73) Assignee: Southwire Company, LLC, Carrollton, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/817,309

(22) Filed: Aug. 3, 2022

Related U.S. Application Data

(63) Continuation of application No. 16/100,961, filed on Aug. 10, 2018, now Pat. No. 11,438,988.

(Continued)

(51) Int. Cl.
*H05B 47/185* (2020.01)
*F21S 2/00* (2016.01)

(Continued)

(52) U.S. Cl.
CPC ............ *H05B 47/185* (2020.01); *F21S 2/005* (2013.01); *H05B 45/30* (2020.01); *H05B 45/37* (2020.01); *H05B 45/50* (2020.01); *F21Y 2115/10* (2016.08)

(58) Field of Classification Search
CPC ........ H05B 45/10; H05B 45/14; H05B 45/30; H05B 45/31; H05B 45/37; H05B 45/50;

(Continued)

(56) References Cited

U.S. PATENT DOCUMENTS

| | | | |
|---|---|---|---|
| 6,111,767 | A | 8/2000 | Handleman et al. |
| 6,429,546 | B1 | 8/2002 | Ropp et al. |

(Continued)

FOREIGN PATENT DOCUMENTS

| | | | |
|---|---|---|---|
| CA | 2906590 A1 | 9/2014 | |
| CN | 202550576 U | 11/2012 | |

(Continued)

OTHER PUBLICATIONS

Restriction Requirement for U.S. Appl. No. 17/589,097, dated Nov. 14, 2022, (6 pages), United States Patent and Trademark Office, US.

(Continued)

*Primary Examiner* — Abdullah A Riyami
*Assistant Examiner* — Syed M Kaiser
(74) *Attorney, Agent, or Firm* — Alston & Bird LLP

(57) ABSTRACT

A power management and smart lighting system is provided that enables efficient distribution of DC power to various building features, including LED lighting. The power management system includes an intelligent power supply unit configured to convert AC power drawn from a building load center into a deadband DC waveform. The deadband DC power generated by the intelligent power supply unit is then transmitted over power-with-Ethernet cables to a plurality of distributed intelligent drivers, each configured to intelligently power one or more LED troffers. The intelligent drivers may be daisy-chained to one another by the power-with-Ethernet cables, enabling a power-ring architecture. To enable easy control of the drivers, intelligent sensors can be distributed throughout the topology and connected to the drivers (e.g., via power-with-Ethernet cables) to enable a wide array of lighting control options.

16 Claims, 15 Drawing Sheets

Related U.S. Application Data

(60) Provisional application No. 62/544,672, filed on Aug. 11, 2017, provisional application No. 62/567,497, filed on Oct. 3, 2017.

(51) Int. Cl.

*F21Y 115/10* (2016.01)
*H05B 45/30* (2020.01)
*H05B 45/37* (2020.01)
*H05B 45/50* (2022.01)

(58) Field of Classification Search

CPC ...... H05B 45/52; H05B 45/54; H05B 45/327; H05B 47/175; H05B 47/185; F21S 2/005; F21Y 2115/10

See application file for complete search history.

(56) References Cited

U.S. PATENT DOCUMENTS 8,106,537 B2 1/2012 Casey et al.
8,134,820 B1 3/2012 Riccio et al.
8,207,637 B2 6/2012 Marroquin et al.
8,257,106 B2 9/2012 Fornage et al.
8,278,845 B1 * 10/2012 Woytowitz ........... H05B 47/185 315/307
8,410,950 B2 4/2013 Takehara et al.
8,435,056 B2 5/2013 Fornage et al.
8,472,220 B2 6/2013 Garrity et al.
8,581,441 B2 11/2013 Rotzoll et al.
8,626,616 B2 1/2014 Eich
8,824,178 B1 9/2014 Baker et al.
9,165,275 B2 10/2015 Fornage
9,270,201 B1 2/2016 Potharaju
9,750,102 B1 * 8/2017 Mao ................... H05B 45/3725
10,523,117 B2 12/2019 Hume et al.
10,951,161 B2 3/2021 Freeman et al.
11,251,621 B1 2/2022 Hume et al.
11,387,775 B2 7/2022 Freeman et al.
11,438,980 B2 * 9/2022 Agarwal ................ G05B 15/02
11,438,988 B1 * 9/2022 Hume .................... H05B 45/37
2005/0080520 A1 * 4/2005 Kline ...................... B65F 1/062 701/1
2005/0128751 A1 * 6/2005 Roberge ................ G06F 3/1446 362/276
2005/0200133 A1 6/2005 Roberge et al.
2006/0002110 A1 * 1/2006 Dowling ............... F21V 23/005 362/249.05
2007/0247823 A1 10/2007 Falk et al.
2008/0236648 A1 10/2008 Klein et al.
2008/0285317 A1 11/2008 Rotzoll
2009/0275242 A1 * 11/2009 Erten ................. H01R 13/6585 439/660
2010/0066260 A1 * 3/2010 Newman, Jr. ...... H05B 41/3921 315/246
2010/0071742 A1 3/2010 de Rooij et al.
2010/0134959 A1 6/2010 Fife et al.
2010/0141158 A1 * 6/2010 Newman, Jr. .......... H05B 35/00 315/182
2010/0145532 A1 6/2010 Gregory et al.
2010/0263704 A1 10/2010 Fornage et al.
2010/0289337 A1 11/2010 Stauth et al.
2010/0307479 A1 12/2010 Park
2011/0056533 A1 3/2011 Kuan
2011/0061705 A1 3/2011 Croft et al.
2011/0080105 A1 * 4/2011 Mayer .................... H05B 47/10 315/250
2011/0090089 A1 4/2011 Luo
2011/0103117 A1 5/2011 Yoneda
2011/0121744 A1 * 5/2011 Salvestrini ............ H02M 1/082 315/246
2011/0197945 A1 8/2011 Schaacke
2011/0202181 A1 8/2011 Lee et al.
2011/0210611 A1 9/2011 Ledenev et al.
2011/0225904 A1 9/2011 Railkar et al.
2011/0248640 A1 * 10/2011 Welten ................... H05B 45/48 315/210
2011/0273015 A1 11/2011 Adest et al.
2011/0273016 A1 11/2011 Adest et al.
2012/0019074 A1 1/2012 Frolov et al.
2012/0080944 A1 * 4/2012 Recker ................... H05B 47/16 307/25
2012/0081934 A1 4/2012 Garrity et al.
2012/0084027 A1 4/2012 Caine
2012/0089260 A1 4/2012 Krohne et al.
2012/0138123 A1 6/2012 Newdoll et al.
2012/0175955 A1 7/2012 Carralero et al.
2012/0175964 A1 7/2012 Yoscovich et al.
2012/0248863 A1 10/2012 Adest et al.
2012/0249150 A1 * 10/2012 Anissimov ............ H05B 41/40 324/415
2012/0250372 A1 10/2012 Knill et al.
2012/0310427 A1 12/2012 Williams et al.
2012/0313443 A1 12/2012 Cheng et al.
2013/0002031 A1 1/2013 Mulkey et al.
2013/0012061 A1 1/2013 Rotzoll et al.
2013/0021006 A1 1/2013 Fornage
2013/0049610 A1 * 2/2013 Chen ...................... H05B 47/10 315/159
2013/0049674 A1 2/2013 Davis
2013/0113291 A1 5/2013 Recker et al.
2013/0134891 A1 * 5/2013 Woytowitz ........... H05B 47/175 315/201
2013/0225005 A1 8/2013 Fornage et al.
2013/0241535 A1 9/2013 Magnussen et al.
2013/0242628 A1 9/2013 Fukatsu et al.
2013/0250634 A1 9/2013 Fornage
2013/0307342 A1 11/2013 Niemela
2013/0346054 A1 12/2013 Mumtaz
2014/0077609 A1 3/2014 Fornage
2014/0102755 A1 * 4/2014 Adriaenssens ......... H01B 11/02 174/113 R
2014/0117769 A1 5/2014 Potharaju et al.
2014/0191583 A1 7/2014 Chisenga et al.
2014/0265550 A1 * 9/2014 Milligan ................. H04L 12/10 307/1
2014/0265585 A1 9/2014 Della Sera et al.
2014/0266289 A1 9/2014 Della Sera et al.
2014/0361695 A1 * 12/2014 Akiyama ............ H05B 45/395 315/185 R
2014/0376270 A1 12/2014 Kern et al.
2015/0002040 A1 * 1/2015 Malyna ............. H05B 45/3575 315/201
2015/0216002 A1 * 7/2015 Melanson .............. H05B 47/10 315/246
2015/0237700 A1 * 8/2015 Woytowitz ........... H05B 45/382 315/307
2015/0244250 A1 8/2015 Toth et al.
2016/0066386 A1 * 3/2016 Catalano .................. G01K 7/01 315/309
2016/0072396 A1 3/2016 Deboy et al.
2016/0094034 A1 3/2016 Divan et al.
2016/0172858 A1 6/2016 Martin et al.
2016/0226252 A1 8/2016 Kravtiz et al.
2016/0270174 A1 * 9/2016 Rimmer ............. H05B 45/3725
2016/0270193 A1 * 9/2016 Lawrenson ........... H04L 9/3221
2016/0299555 A1 * 10/2016 Rucker ................ H05B 47/185
2016/0360594 A1 * 12/2016 Chemel ................ H05B 47/105
2017/0019960 A1 * 1/2017 Qu ..................... H05B 45/3725
2017/0027029 A1 * 1/2017 Hu ......................... H05B 45/10
2017/0179876 A1 6/2017 Freeman et al.
2017/0223807 A1 * 8/2017 Recker ...................... H02J 9/02
2017/0231058 A1 * 8/2017 Sadwick ................ H05B 45/18
2017/0238401 A1 * 8/2017 Sadwick .............. H05B 45/395 315/294
2017/0332462 A1 * 11/2017 Tikkanen ............... H05B 47/19
2018/0211509 A1 * 7/2018 Ramaci ................. A61J 7/0481

(56) References Cited

U.S. PATENT DOCUMENTS

| | | | | |
|---|---|---|---|---|
| 2019/0029099 | A1* | 1/2019 | Mao | H05B 45/50 |
| 2019/0280895 | A1* | 9/2019 | Mather | H04L 41/12 |

FOREIGN PATENT DOCUMENTS

| | | | |
|---|---|---|---|
| CN | 104158394 | A | 11/2014 |
| EP | 2773036 | A1 | 9/2014 |
| EP | 2973976 | B1 | 1/2016 |
| GB | 2483317 | A | 3/2012 |
| JP | H10174452 | A | 6/1998 |
| JP | 2001238466 | A | 8/2001 |
| TW | 201519555 | A | 5/2015 |
| WO | WO-2003/077398 | A2 | 9/2003 |
| WO | WO-2006/005125 | A1 | 1/2006 |
| WO | WO-2012/170726 | A2 | 12/2012 |
| WO | WO-2013/107782 | A1 | 7/2013 |
| WO | WO-2014/152765 | A2 | 9/2014 |
| WO | WO-2015/015112 | A1 | 2/2015 |

OTHER PUBLICATIONS

U.S. Appl. No. 16/100,961, filed Aug. 10, 2018, U.S. Pat. No. 11,438,988, Issued.

NonFinal Office Action for U.S. Appl. No. 17/804,810, dated Jan. 20, 2023, (13 pages), United States Patent and Trademark Office, US.

International Search Report and Written Opinion for corresponding International Application No. PCT/US2016/067556, dated Mar. 16, 2017.

Microchip Technology Inc. *Grid-Connected Solar Microinverter Reference Design Using a dsPIC® Digital Signal Controller*, AN1338 Technical Bulletin, Jul. 2010, 56 pages, retrieved from <http://ww1.microchip.com/downloads/en/AppNotes/01338D.pdf> on Jul. 22, 2016.

Roos et al., *Solar Electric System Design, Operation and Installation*, Washington State University Extension Energy Program, Oct. 2009, (35 pages). [Retrieved from the Internet Aug. 6, 2019] <www.energy.wsu.edu/Documents/SolarPVforBuildersOct2009.pdf>.

Vu, Trune-Kien et al., "A New Adaptive Dead-Time Compensation for Single-Phase Grid-Connected PV Inverter," Proceeding of 26th Annual Applied Power Electronics Conference and Exposition (APEC), Mar. 6, 2011, pp. 923-930, IEEE, U.S.

European Patent Office, Communication Pursuant to Rules 161(2) and 162 EPC for Application No. 14770361.5, dated Nov. 5, 2015, 2 pages, Germany.

European Patent Office, Extended European Search Report for Application No. 14770361.5, dated Nov. 24, 2016, 9 pages, Germany.

European Patent Office, Communication Pursuant to Rules 70(2) and 70a(2) EPC for Application No. 14770361.5, dated Dec. 13, 2016, 1 page, Germany.

European Patent Office, Communication Under Rule 71(3) EPC for Application No. 14770361.5, dated Nov. 14, 2018, 61 pages, Germany.

International Searching Authority, International Search Report and Written Opinion for International Application No. PCT/US2014/027708, dated Oct. 2, 2014, 24 pages, United States Patent and Trademark Office, U.S.A.

International Bureau of WIPO, International Preliminary Report on Patentability for International Application No. PCT/US2014/027708, dated Sep. 15, 2015, 22 pages, Switzerland.

International Searching Authority, International Search Report and Written Opinion for International Application No. PCT/US2016/016059, dated Jun. 27, 2016, 14 pages, the Netherlands.

International Searching Authority, International Search Report and Written Opinion for International Application No. PCT/US2017/060428, dated Feb. 7, 2018, 15 pages, European Patent Office, the Netherlands.

United States Patent and Trademark Office, Office Action for U.S. Appl. No. 14/211,693, dated Mar. 11, 2016, 7 pages, U.S.A.

United States Patent and Trademark Office, Office Action for U.S. Appl. No. 14/211,693, dated Dec. 29, 2016, 8 pages, U.S.A.

United States Patent and Trademark Office, Office Action for U.S. Appl. No. 14/211,693, dated Apr. 21, 2017, 12 pages, U.S.A.

United States Patent and Trademark Office, Office Action for U.S. Appl. No. 16/100,961, dated Mar. 22, 2019, 19 pages, U.S.A.

United States Patent and Trademark Office, Office Action for U.S. Appl. No. 15/383,647, dated May 1, 2019, 12 pages, U.S.A.

United States Patent and Trademark Office, Notice of Allowance for U.S. Appl. No. 14/058,270, dated Sep. 23, 2016, 12 pages, U.S.A.

United States Patent and Trademark Office, Corrected Notice of Allowability for U.S. Appl. No. 14/058,270, dated Dec. 28, 2016, 3 pages, U.S.A.

United States Patent and Trademark Office, Office Action for U.S. Appl. No. 14/612,159, dated Jan. 3, 2017, 17 pages, U.S.A.

United States Patent and Trademark Office, Notice of Allowance for U.S. Appl. No. 15/425,767, dated Sep. 14, 2018, 13 pages, U.S.A.

U.S. Appl. No. 61/270,809, "Method and System for Locating Stolen Solar Power System Components", Unpublished (filed Jul. 14, 2009), (Martin Fronage, Inventor and Assignee), (32 pages).

Argentine Patent and Trademark Office, Office Action for Argentine Patent Application No. 20140101267, dated Mar. 11, 2019, 5 pages, Argentina.

Mexican Patent Office, Office Action for Mexican Patent Application No. MX/a/2015/012438, dated Dec. 4, 2017, 2 pages, Mexico.

Mexican Patent Office, Notice of Allowance for Mexican Patent Application No. MX/a/2015/012438, dated Jun. 11, 2018, 1 page, Mexico.

Chilean Patent and Trademark Office, Written Opinion for Chilean Patent Application No. 201502718, dated Jan. 15, 2018, 11 pages, Chile.

United States Patent and Trademark Office, NonFinal Office Action for U.S. Appl. No. 16/054,625, dated Apr. 1, 2021, (23 pages), USA.

NonFinal Office Action for U.S. Appl. No. 16/100,961, dated Nov. 22, 2019, (18 pages), United States Patent and Trademark Office, USA.

Final Office Action for U.S. Appl. No. 16/100,961, dated Jun. 11, 2020, (13 pages), United States Patent and Trademark Office, USA.

Notice of Allowance for U.S. Appl. No. 16/100,961, dated Jan. 15, 2021, (7 pages), United States Patent and Trademark Office, USA.

Supplemental Notice of Allowability for U.S. Appl. No. 16/100,961, dated Feb. 24, 2021, (4 pages), United States Patent and Trademark Office, USA.

United States Patent and Trademark Office, NonFinal Office Action for U.S. Appl. No. 16/100,961, dated Jul. 20, 2021, (16 pages), USA.

NonFinal Office Action for U.S. Appl. No. 17/174,771, dated Nov. 8, 2021, (23 pages), United States Patent and Trademark Office, USA.

Notice of Allowance and Fee(s) Due for U.S. Appl. No. 16/054,625, dated Oct. 6, 2021, (11 pages), United States Patent and Trademark Office, USA.

Final Rejection for U.S. Appl. No. 16/100,961, dated Nov. 23, 2021, (16 pages), United States Patent and Trademark Office, USA.

Chinese Office Action for Chinese Patent Application No. 201680079821.6, dated Feb. 21, 2022, (6 pages), Chinese National Intellectual Property Administration, Beijing City, China.

Great Britain Examination Report for Great Britain Patent Application No. GB2114305.2, (3 pages), Intellectual Property Office, South Wales, United Kingdom.

Notice of Allowance for U.S. Appl. No. 17/174,771, dated Feb. 28, 2022, (10 pages), United States Patent and Trademark Office, USA.

Notice of Allowance for U.S. Appl. No. 16/100,961, dated May 3, 2022, (10 pages), United States Patent and Trademark Office, USA.

Corrected Notice of Allowability for U.S. Appl. No. 17/174,771, dated May 12, 2022, (4 pages), United States Patent and Trademark Office, USA.

Corrected Notice of Allowability for U.S. Appl. No. 16/100,961, dated Jul. 25, 2022, (3 pages), United States Patent and Trademark Office, USA.

(56) References Cited

OTHER PUBLICATIONS

Canadian Examination Report for Canadian Patent Application No. 3,008,853, dated Jan. 26, 2023, (5 pages), Canadian Intellectual Property Office, Quebec, Canada.
NonFinal Office Action for U.S. Appl. No. 17/589,097, dated Apr. 21, 2023, (14 pages), United States Patent and Trademark Office, US.
NonFinal Office Action for U.S. Appl. No. 17/589,097, dated Oct. 19, 2023, (12 pages), United States Patent and Trademark Office, US.
*Examination Report for Canadian Patent Application No. 3,008,853, dated Dec. 4, 2023, (3 pages), Canadian Intellectual Property Office, Quebec, Canada.

* cited by examiner

DC POWER MANAGEMENT SYSTEM

CROSS REFERENCE TO RELATED APPLICATIONS

This application is a continuation of U.S. Non-Provisional patent application Ser. No. 16/100,961, filed Aug. 10, 2018, which claims priority and the benefit of U.S. Provisional Patent Application No. 62/544,672, filed Aug. 11, 2017, and U.S. Provisional Patent Application No. 62/567,497, filed Oct. 3, 2017, each of which is hereby incorporated herein by reference in its entirety.

BACKGROUND

Throughout the world's major economies, smart lighting and digital ceiling initiatives are leading to significant changes in building lighting and power distribution. In particular, there has been a proliferation of light-emitting diode (LED) lighting options and competing smart lighting topologies in the marketplace as the demand for more efficient and more capable lighting solutions has increased. Smart lighting systems, which enable automatic control and adjustment of building lighting, are growing rapidly in popularity. These smart lighting systems generally comprise (i) luminary components (e.g., bulbs, fixtures) and (ii) a variety of control and communication components (e.g., drivers, ballasts, gateways, etc.). LEDs, for example, have become particularly popular as the luminary component for smart lighting systems. In comparison to conventional lighting technologies, LEDs consume less power, have a longer life, are more versatile, and have improved color quality. Control and communication components, however, are offered as part of a number of smart lighting platforms and topologies having various drawbacks.

As just some examples, FIGS. 1A-1D provide schematic representations of topologies having line-based discrete solutions, digitally addressable lighting interfaces, Zigbee and Zwave Wireless solutions, and Power Over Ethernet (PoE) architectures. Many of these topologies are difficult to install and have fundamental limitations that reduce their flexibility. The PoE architecture shown in FIG. 1D, for example, requires each of its LED drivers to be individually wired back to a central PoE switch with Cat 5 cable. This is due, at least in part, to the Cat 5 cables' distance limitations and wattage thresholds for reliably and effectively transmitting power. As a result, PoE systems of the type shown in FIG. 1D are labor intensive to install and require locating PoE switches in central locations within a particular building area. The topologies shown in FIGS. 1A-1C also suffer from limitations with respect to ease of installation and flexibility in topology design. These existing topologies also lack interoperability and can be difficult to fully integrate with occupancy, HVAC, security, and other building features. These drawbacks can lead to, among other things, increases in the cost of system components, installation, and long-term maintenance.

Thus, there is an on-going need in the art for improved power management systems for powering lighting and other building features. In particular, there is a need for improved system control and flexibility, an integrated architecture with minimal components, improved ease of installation, improved ease of maintenance, improved safety, and reduced cost.

BRIEF DESCRIPTION OF THE DRAWINGS

Reference will now be made to the drawings, which are not necessarily drawn to scale, and wherein.

DETAILED DESCRIPTION OF VARIOUS EMBODIMENTS

Figure 1B:
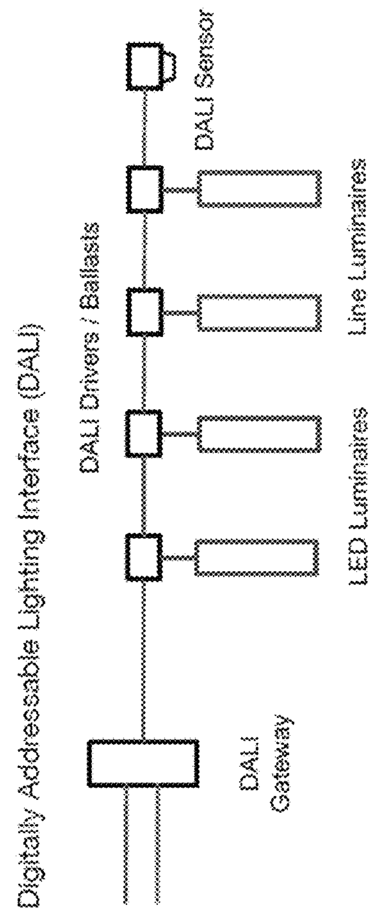
FIGS. 1A-1D show schematic representations of various existing digital ceiling topologies.
Figure 1A:
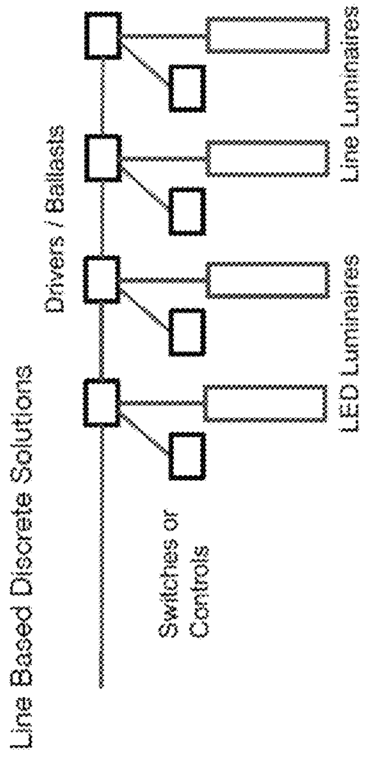
Figure 1D:
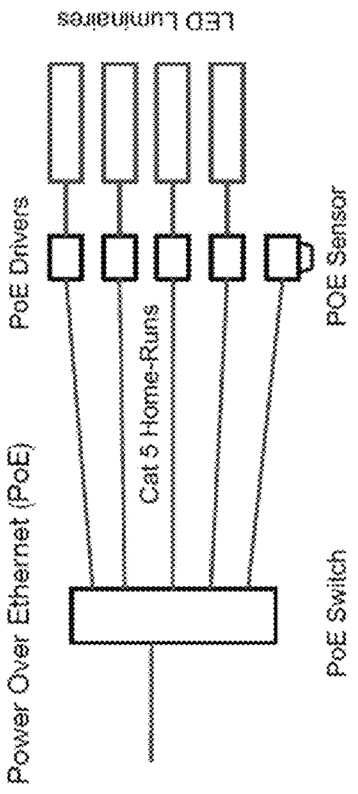
Figure 1C:
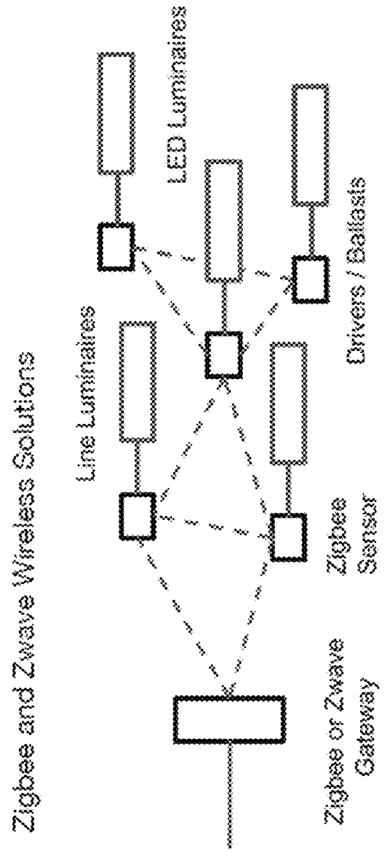

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. Like numbers refer to like elements throughout.

Various embodiments of the present invention are directed to a power management and smart lighting system that enables efficient distribution of DC power to various building features, including LED lighting. According to various embodiments, the power management system includes an intelligent power supply unit configured to convert AC power drawn from a building load center into a deadband DC waveform. The deadband DC power generated by the intelligent power supply unit is then transmitted over power-with-Ethernet cables to a plurality of distributed intelligent drivers, each configured to intelligently power one or more LED troffers. In various embodiments, the intelligent drivers are daisy-chained to one another by the power-with-Ethernet cables, enabling a power-ring architecture. To enable easy control of the drivers, intelligent sensors are distributed throughout the topology and connected to the drivers over power-with-Ethernet cables to enable a wide array of lighting control options.

As explained in greater detail herein, the intelligent power supply unit (iPSU) and distributed, daisy-chained intelligent drivers (iDrivers) improve the overall efficiency and cost-effectiveness of the power management system. For example, because the iPSU is configured to convert AC power into a deadband DC waveform-which includes regular periods of zero-voltage dead time—the transmission of power from the iPSU to the distributed iDrivers presents a reduced risk of arcing, thereby improving the safety of the system as a whole. In addition, various embodiments of the iPSU are provided with a modular configuration that enables the iPSU to be easily scaled for different applications. As explained in greater detail herein, the iPSU is provided with removable power modules, which can be added and removed into the iPSU's chassis as needed in order to provide the necessary capacity for converting AC power into deadband DC power. For this reason, each individual iPSU unit can be used in a variety of power management systems, including both small-scale (e.g., residential) and large-scale (e.g., commercial building) systems.

In various embodiments, the distributed iDrivers are connected to one another—and ultimately to the iPSU—by power-with-Ethernet (PWE) cables and connectors. The power-with-Ethernet cables are each comprised, for example, of two power conductor cables, two twisted pairs of data communication cables, and two additional untwisted data communication cables. As explained in greater detail herein, the inclusion of separate power and data communication cables within the PWE cable enables efficient transmission of power alongside uninterrupted data communication. As an example, the use of PWE cables in the power management system enables a large number of iDrivers to be daisy-chained together (unlike, for example, conventional power-over-Ethernet systems, which are more power limited and require each driver to be separately wired back to a central switch). This improves ease of installation and improves the flexibility in the system's architecture and design. Moreover, when the iDrivers are daisy-chained with a continuous power-ring architecture, the power management system has improved resistance to system vulnerabilities (e.g., a fault or break at one point in the daisy-chain ring can be circumvented by communication with a particular iDriver around the opposite side of the ring). Additionally, the use of separate, dedicated communication wires enables the communication between the iPSU, iDrivers, and other system components using high bandwidth protocols, such as Ethernet. As a result, larger amounts of data can be exchanged as compared with lower bandwidth protocols.

Figure 2:
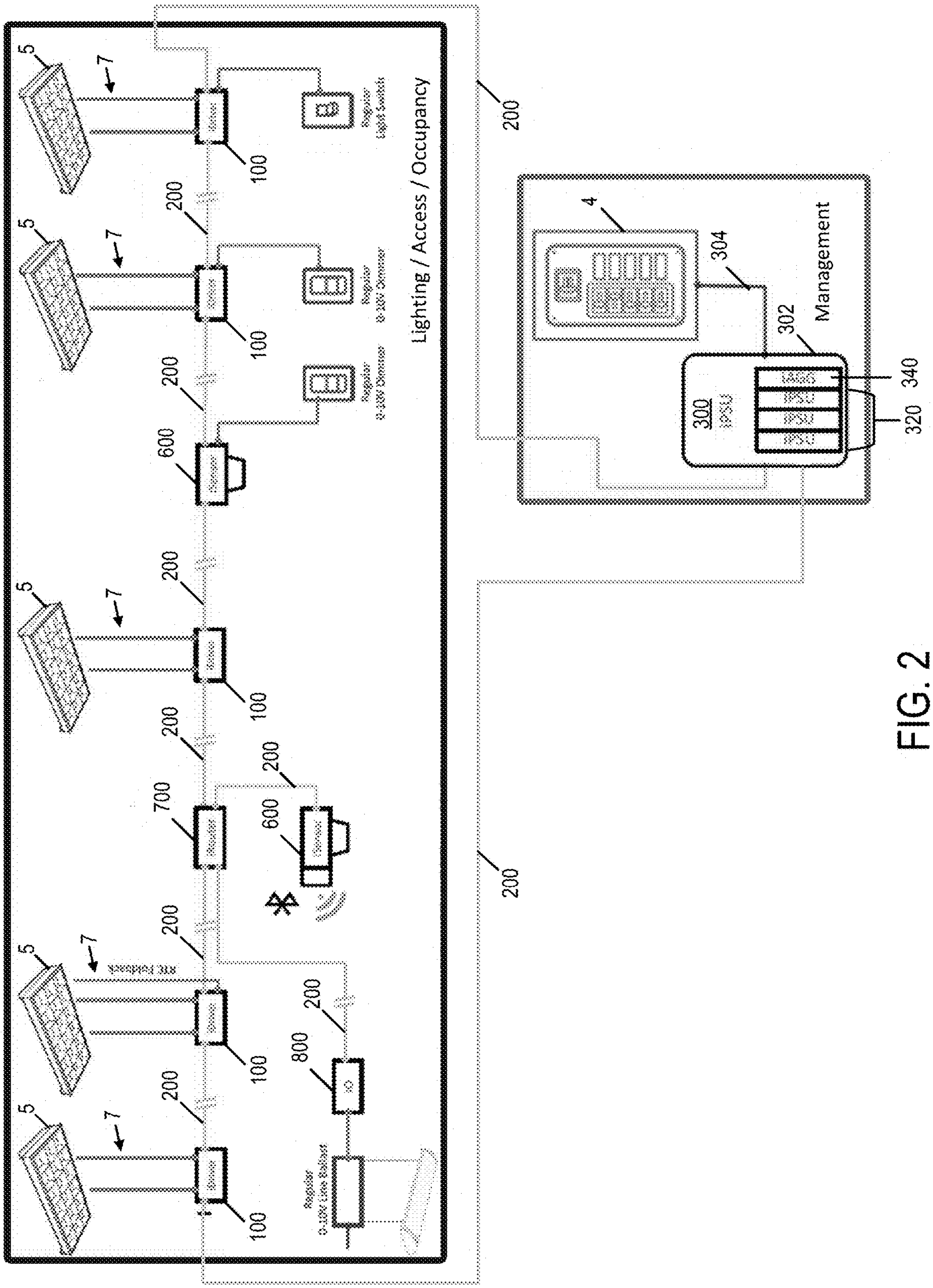
FIG. 2 shows a schematic diagram of a power management system for LED lighting having a power-ring architecture according to one embodiment.

FIG. 2 shows a schematic diagram of a power management system for LED lighting according to one embodiment of the present invention. In the illustrated embodiment of FIG. 2, the power management system is generally comprised of a plurality of LED troffers 5, a plurality of intelligent drivers (iDrivers) 100, an intelligent power supply unit (iPSU) 300, a plurality of intelligent sensor units (iSensors) 600, a plurality of intelligent router modules (iRouters) 700, and a plurality of remote input/output modules (remote iO modules) 800. As explained in detail herein, the iPSU 300 is generally configured to convert AC power drawn from a building load center 4 into deadband DC power transmitted to each of the iDrivers 100. The iPSU 300 then distributes this deadband DC power to the plurality of iDrivers 100 via power-with-Ethernet (PWE) cables 200, which are used to daisy chain the iDrivers 100 together. The iDrivers 100 are generally configured to receive the deadband DC power—via the PWE cables 200—and in turn power and control their respective LED troffers 5. Each of these components of the power management system will now be described in greater detail.

According to various embodiments, the LED troffers 5 shown in FIG. 2 are conventional LED troffers (e.g., a 3 color LED system with 50 W per channel) installed, for example, in a commercial building environment. The LED troffers 5 each comprise plurality of LEDs configured to output light in response to power received from an iDriver 100. As shown in FIG. 2, each troffer 5 is connected to an iDriver 100 by power cables 7. According to various embodiments, the iDrivers 100 may be positioned directly on conventional lighting fixtures or installed remotely from the LED troffers 5.

Figure 3A:
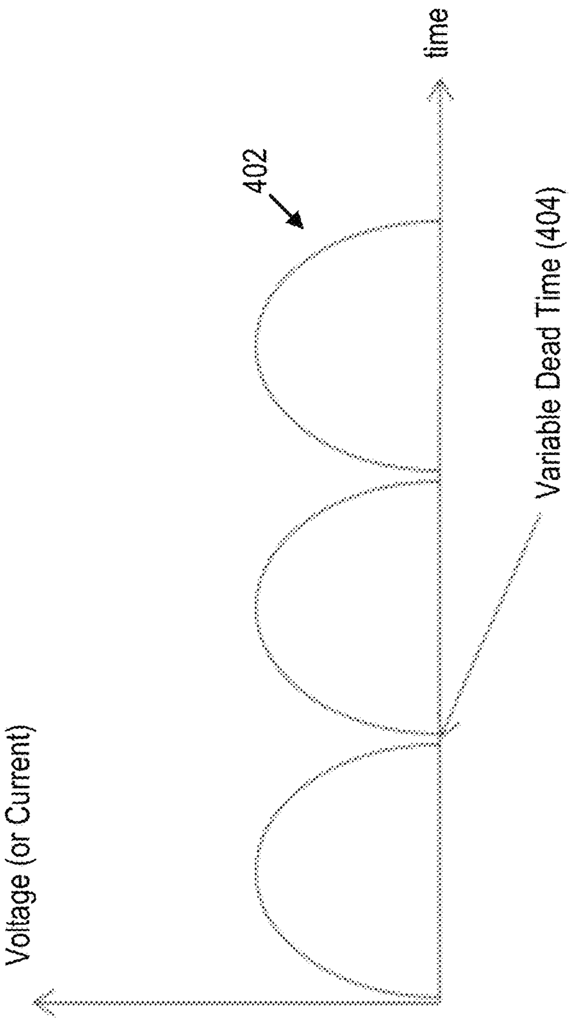
FIG. 3A shows a deadband DC waveform generated by an intelligent power supply unit according to one embodiment.
Figure 3B:
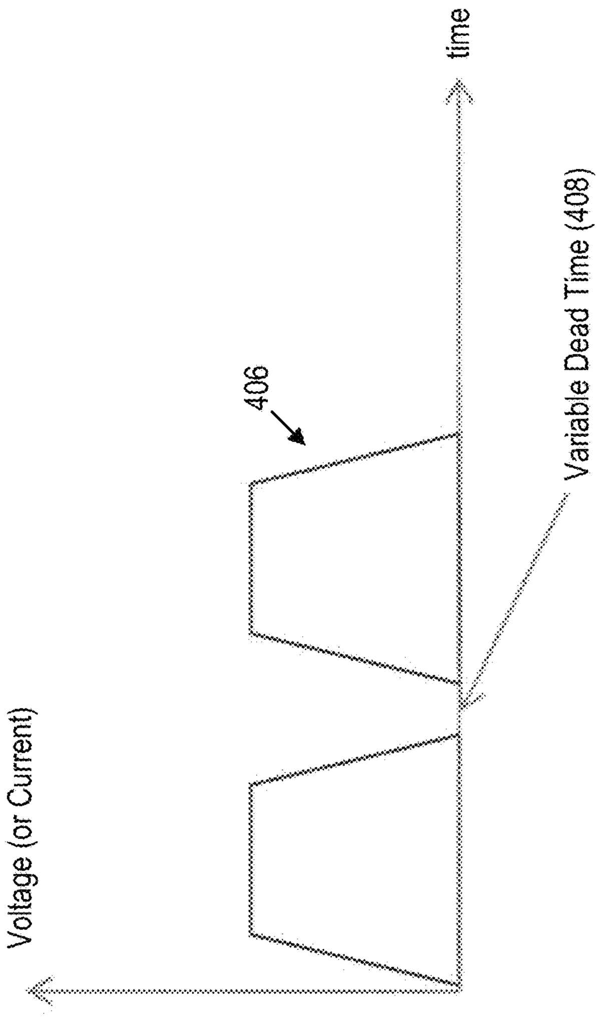
FIG. 3B shows a deadband DC waveform generated by an intelligent power supply unit according to another embodiment.

According to various embodiments, the power management system's iDrivers 100 are each configured to receive deadband DC power generated by the iPSU 300. As an example, FIG. 3A illustrates a deadband DC waveform 402 generated by the iPSU 300 from AC power drawn from a building loading center 4 according to one embodiment. As shown in FIG. 3A, the deadband DC waveform 402 is a rectified sinewave having periods of dead time 404—e.g., zero voltage—between the peaks of the rectified sinewave. Unlike an AC waveform, the deadband DC waveform 402 does not cross zero voltage. However, because the waveform 402 includes regular deadbands 404 of zero voltage, an arc developing in the power management system will extinguish during the deadband period 404. As a second example, FIG. 3B illustrates a deadband DC waveform 406 generated by the iPSU 300 from AC power drawn from the building load center 4 according to another embodiment. As shown in FIG. 3B, the deadband DC waveform 406 is a modified trapezoidal waveform and—like the waveform 402—includes deadband periods 408 between its peaks.

According to various embodiments, the intelligent power supply unit (iPSU) 300 is configured to generate deadband DC power for distribution to the power management system's iDrivers 100, serve as a control and data aggregation center for the power management system, and act as a communications gateway to enable data transmission between system components (e.g., iDrivers 100) and remote systems outside of the power management system (e.g., remote computers or other devices). As discussed in detail below, the iPSU 300 is also provided with a modular configuration that allows it to be easily scaled up (or down) to accommodate various power requirements for various environments, including commercial and residential scale applications.

Figure 4B:
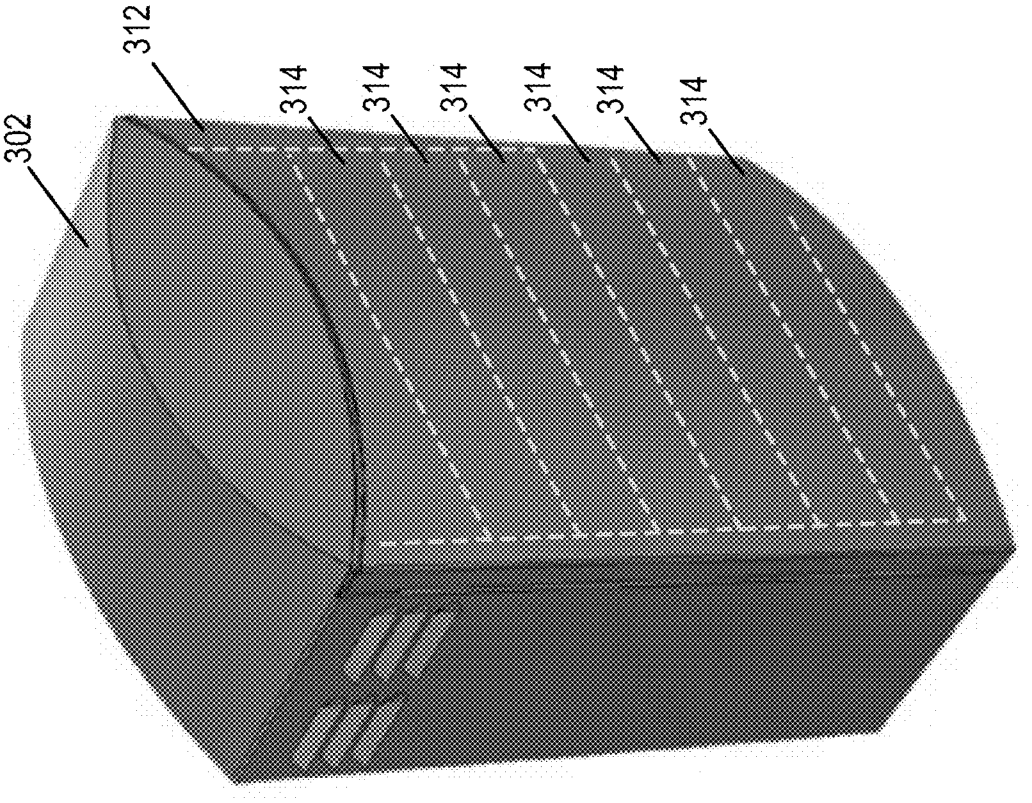
FIGS. 4A and 4B show isometric views of an intelligent power supply unit chassis according to one embodiment.
Figure 4A:
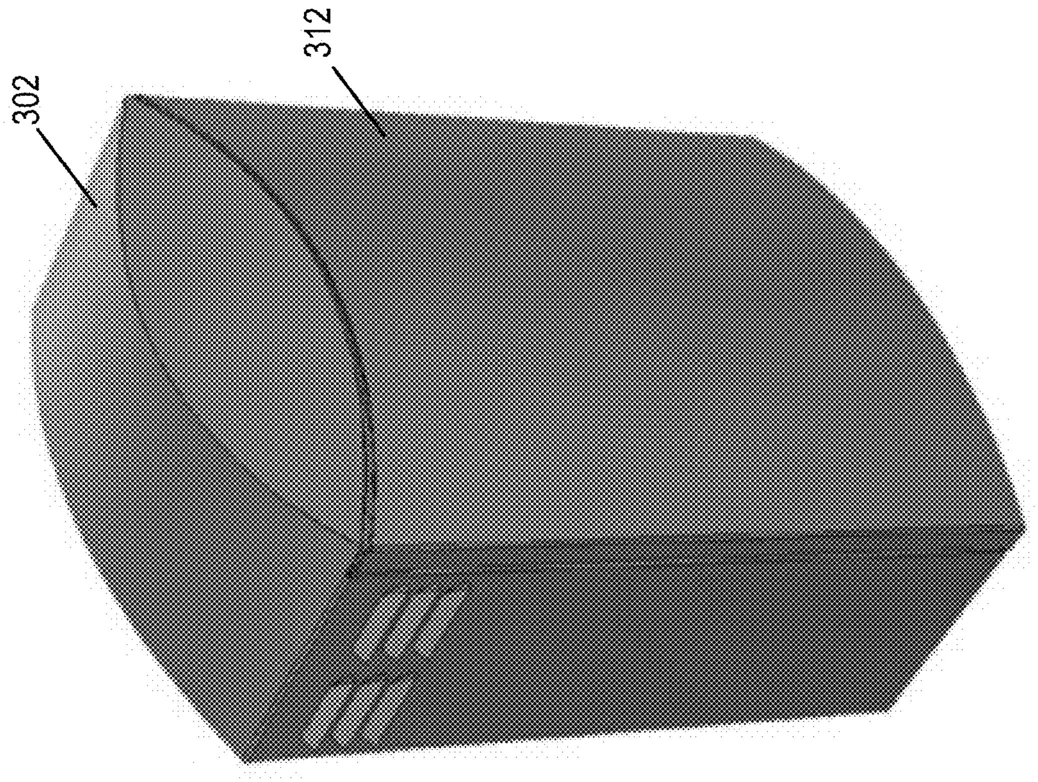

FIG. 2 includes a schematic diagram of the iPSU 300 according to one embodiment. As shown in FIG. 2, the iPSU 300 is comprised of a chassis 302, which is configured for housing a plurality of removable power modules 320 and at least one aggregator module 340. FIGS. 4A and 4B show the iPSU chassis 302 in isolation according to one embodiment. As shown in FIG. 4A, the iPSU chassis 302 includes a door 312, which can be opened and closed to access the interior portion of the chassis 302. In addition, FIG. 4B illustrates schematically a plurality of slots 314 provided in the interior portion of the chassis 302. According to various embodiments, the slots 314 can be dimensioned to receive and secure the removable modules 320 and 340 described herein. According to various embodiments, the removable modules 320 and 340 can be connected by a bus bar assembly configured to engage electrical contacts on the modules 320, 340 when they are inserted into the iPSU 300.

Referring back to FIG. 2, the iPSU's chassis 302 includes inputs and outputs for PWE cables 200 connected to a lighting system—e.g., the various network of iDrivers 100, iSensors 600, and other components shown in FIG. 2. In particular, FIG. 2 shows two PWE cables 200 connected to the iPSU 300 in order to form a power-ring architecture connecting the lighting system components. The iPSU chassis 302 also includes a line connection 304 to the building load center 4, from which the iPSU 300 draws AC power.

According to various embodiments, the iPSU's power modules 320 are switch mode power supplies configured to convert AC power drawn from the building load center 4 into deadband DC power (e.g., a rectified sine wave having deadband periods as shown in FIG. 3A). The resulting deadband DC power is then delivered to the various iDrivers 100 and other system components via PWE cables 200, as described in greater detail herein.

Figure 5:
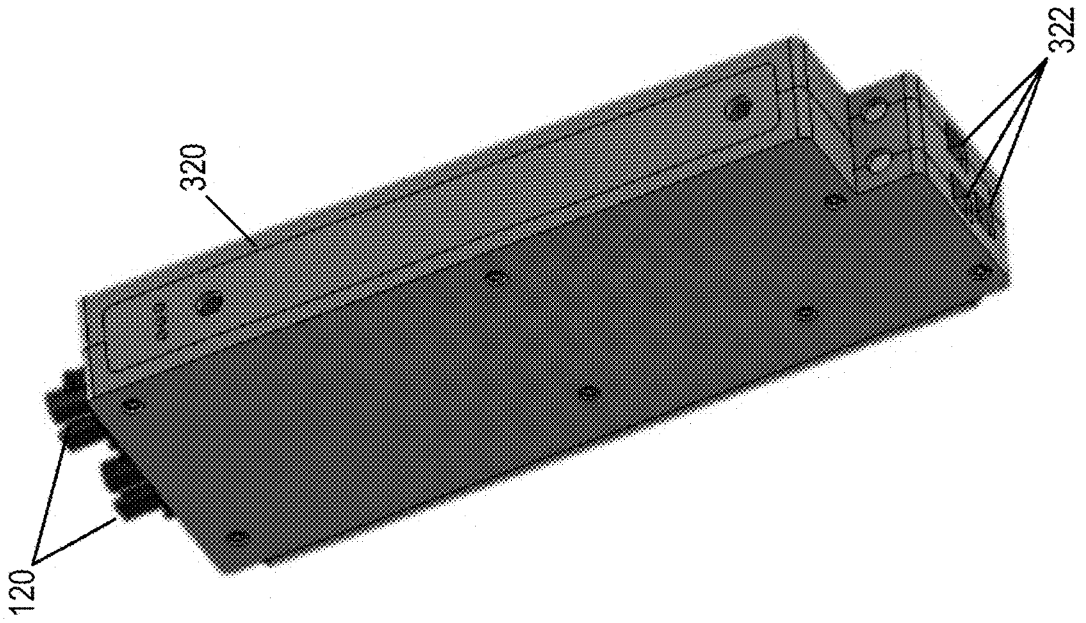
FIG. 5 shows a power module of an intelligent power supply unit according to one embodiment.

FIG. 5 illustrates a single power module 320 according to one embodiment. As shown in FIG. 5, the power module 320 includes a pair of PWE connectors 120 at its upper end, which facilitate connection to PWE cables 200 delivering power to the iDrivers 100 and other system components. In addition, the power module 320 includes a plurality of electrical contacts 322 at its opposite end, which are configured to interface with tabs of the iPSU's bus bar assembly. In other words, when the power module 320 is inserted into one of the iPSU's slots 314, the bus bar assembly's tabs will be inserted into the electrical contacts 322 of the power module 320, thereby electrically connecting the power module 320 with the remaining iPSU components.

Figure 6A:
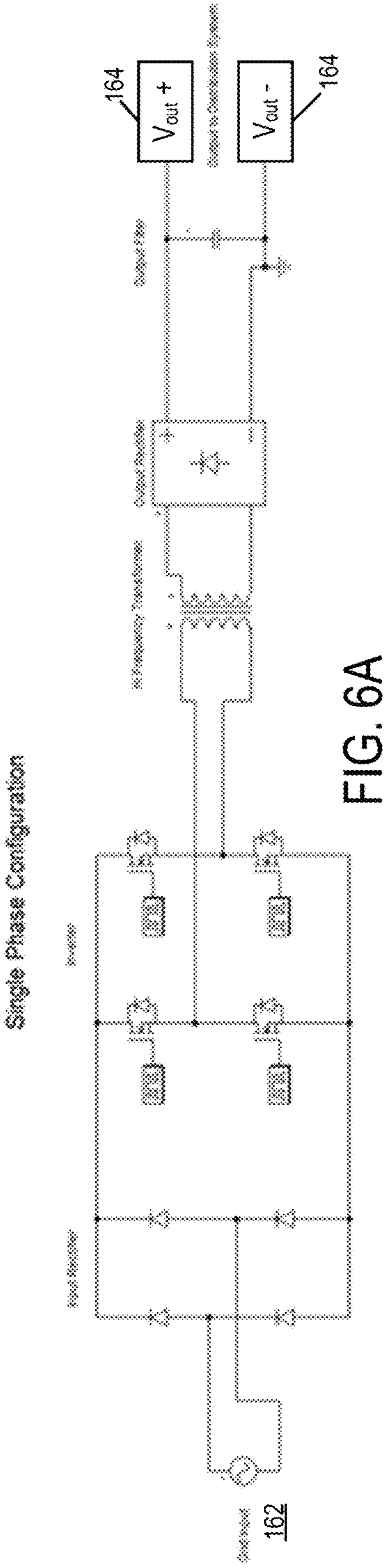
FIGS. 6A and 6B show circuit diagrams for a power module of an intelligent power supply unit according to various embodiments.
Figure 6B:
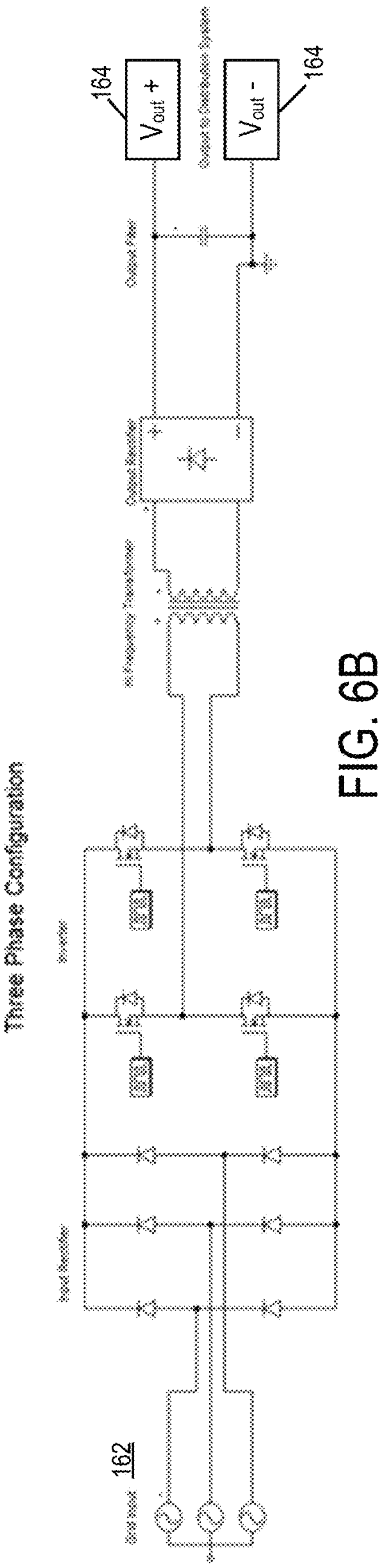

FIGS. 6A and 6B show single phase and three phase circuit diagrams for the power module 320. As shown in FIGS. 6A and 6B, the power modules' circuit includes a grid input 162 for receiving AC power. An input rectifier, inverter, high-frequency transformer, output rectifier, and output filter are then arranged to convert the input AC power into low voltage deadband DC power (e.g., a 48V deadband waveform as shown in FIG. 3A). Additionally, according to certain embodiments, the frequency and widths of the deadbands 404 can be adjusted (e.g., for time and length such that power transmission is optimized). The deadband DC power is then transmitted through voltage outputs 164 (positive and negative). The outputs 164 may be electrically connected, for example, to the power module's PWE connectors 120 (shown in FIG. 5).

As will be appreciated from the description herein, the iPSU 300 can be scaled to handle various thresholds of power by adding or removing power modules 320. For example, in the illustrated embodiment of FIG. 2, the iPSU 300 is rated for 10 kW. However, by adding or removing power modules 320, the iPSU 300 can be scaled to accommodate higher or lower loads. As a result, the modular configuration of the iPSU 300—which enables the power modules 320 to be easily added or removed from the iPSU chassis 302—allows for the iPSU to be easily scaled up (or down) to accommodate various environments, including residential and commercial applications.

According to various embodiments, the iPSU's aggregator module 340 is configured to control the operation of the iPSU 300, orchestrate user policies, collect and perform edge mining on all sensor data, host installer and maintainer applications, and generally function as a communications gateway between the remaining components of the power management system (e.g., the iDrivers 100, iSensors 600, etc.) and remote devices (e.g., computers configured for interoperability with the iPSU 300). In the illustrated embodiment of FIG. 2, the aggregator module 340 includes at least one dedicated processor and associated memory storage for running software and applications related to the iPSU's functionality. For example, the aggregator module 340 is configured to send and receive data from the iDrivers 100 via the PWE cables 200 connecting the iDrivers 100 to the iPSU 300. The aggregator module 340 also provides the iPSU 300 with a data logging environment and can receive and store data relating to the functionality of each iDriver 100 in the power management system (e.g., metered consumption data relating to each iDriver 100). According to various embodiments, the aggregator module 340 is also capable of operating a dynamic host configuration protocol (DHCP) to allocate IP addresses (e.g., renewed per session) for each iDriver 100. In this way, the aggregator module 340 is able to automatically map iDrivers 100 in a given environment and transmit information and instructions to specific iDrivers 100 in the power management system.

Figure 7:
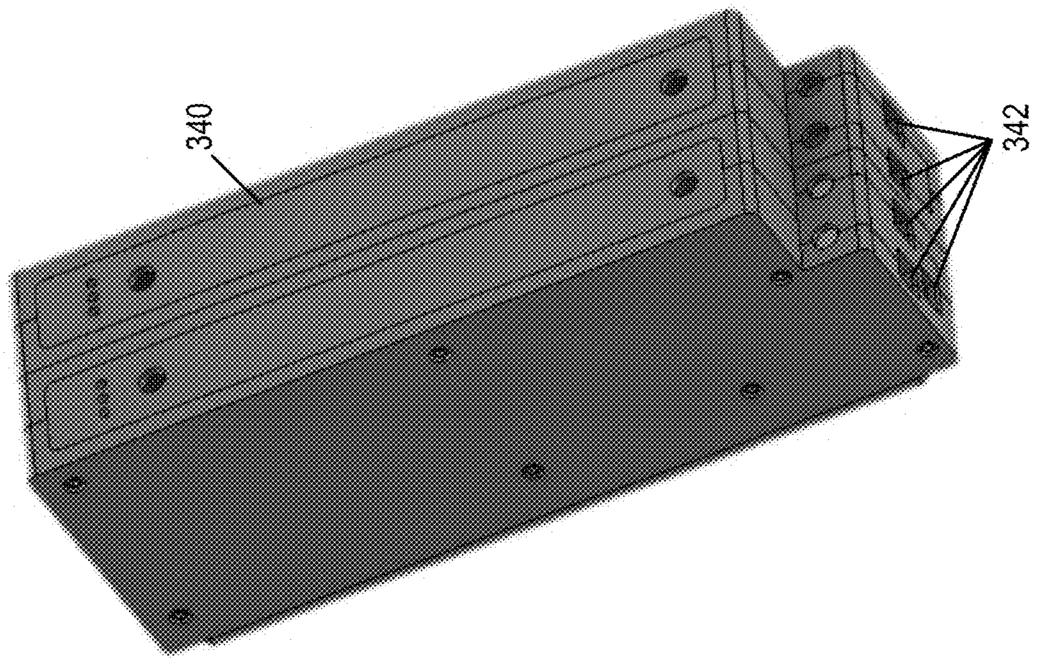
FIG. 7 shows an aggregator module of an intelligent power supply unit according to one embodiment.

FIG. 7 illustrates an aggregator module 340 according to one embodiment. As shown in FIG. 7, the aggregator module 340 includes a plurality of electrical contacts 342, which are configured to interface with tabs of the iPSU's bus bar assembly. In other words, when the aggregator module 340 is inserted into the iPSU, the bus bar assembly's tabs will be inserted into the electrical contacts 342 of the aggregator module 340, thereby electrically connecting the aggregator module 340 with the remaining iPSU components. In addition, the aggregator module 340 may include a Wi-Fi antenna (e.g., configured to provide communication with the aggregator module 340 over a wireless internet network) and an Ethernet uplink 344 (e.g., configured to provide communication with the aggregator module 340 over a dedicated network).

Figure 8:
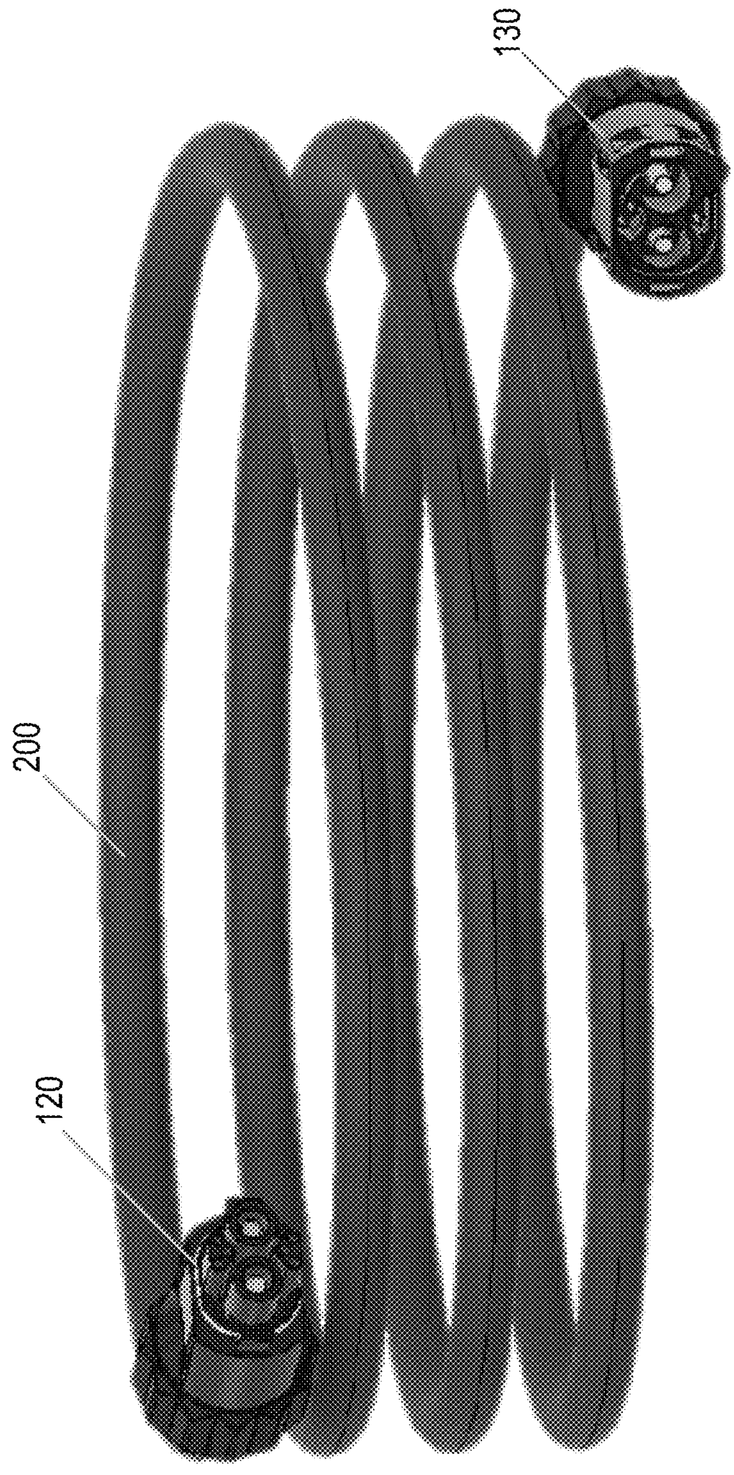
FIG. 8 shows a power-with-Ethernet cable according to one embodiment.

As noted earlier with respect to FIG. 2, the iPSU 300 is connected to the iDrivers 100 and other system components by PWE cables 200. FIG. 8 shows a PWE cable 200 according to one embodiment. As shown in FIG. 8, each PWE cable 200 includes a female PWE connector 120 at one end and a male PWE connector 130 at the opposite end.

Figure 9B:
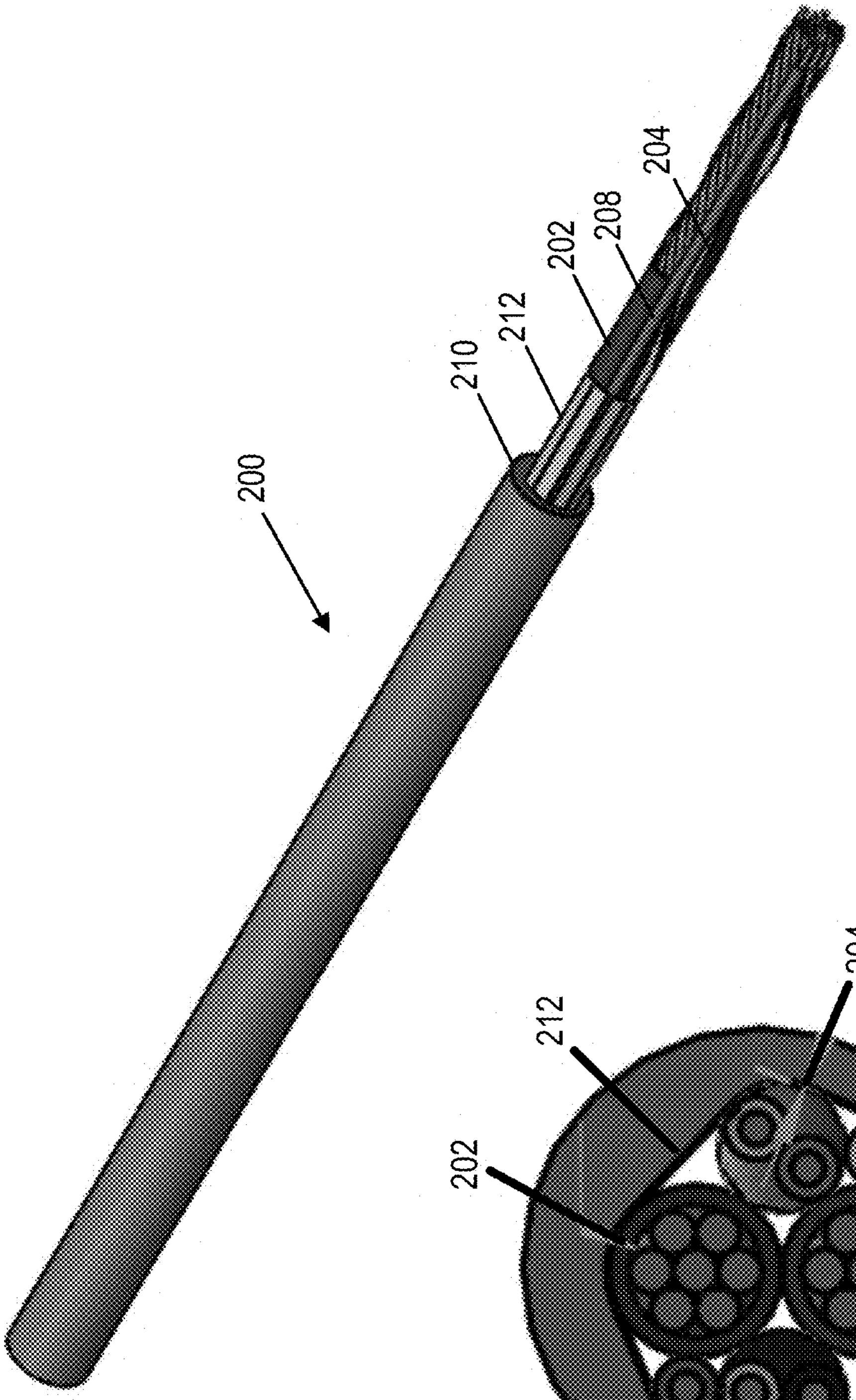
FIGS. 9A and 9B show cross-sectional and isometric cut-away views of the power-with-Ethernet cable of FIG. 7 according to one embodiment.
Figure 9A:
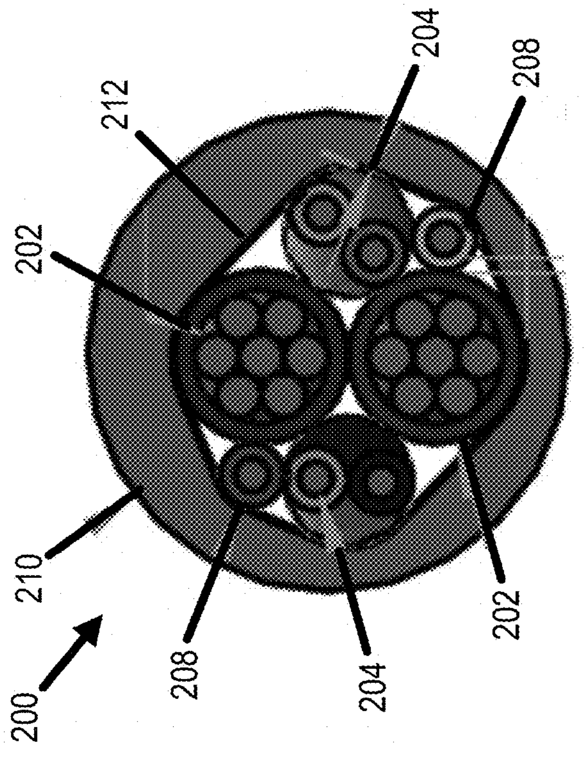

According to various embodiments, each PWE cable 200 is comprised of two power conductors, two twisted pairs of conductors for data communication, and two additional untwisted data communication conductors. FIGS. 9A and 9B illustrate cross-sectional and isometric cut-away views of the PWE cable 200, respectively, according to one embodiment. As shown in FIG. 9A, the PWE cable 200 includes two power conductors 202 positioned adjacent to one another, two twisted pairs of conductors for data communication 204 positioned on opposite sides of the power conductors 202, and two additional untwisted data communication conductors 208. In the illustrated embodiment, the power conductors 202 are AWG 12 7 strand copper wires coated with a protective material (e.g., PVC or HDPE insulation). Additionally, in the illustrated embodiment, the twisted pair data communication conductors 204 and untwisted data communication conductors 208 are AWG 24 solid copper wires coated with a protective material (e.g., PVC or HDPE insulation). As shown in FIGS. 9A and 9B, the power conductors 202, twisted pairs of data communication conductors 204, and untwisted data communication conductors 208 wrapped with a protective wrap 212 (e.g., a thin polyester wrap) and positioned within a cable jacket 210 (e.g., PVC, PE, or TPE cable jacket). In the illustrated embodiment of FIGS. 9A and 9B, the combination of cables 202, 204, and 208 enables a round cable (e.g., as can be seen from the cross-sectional view of FIG. 9A).

According to various embodiments, the PWE cable's power conductors 202 are configured to transmit the dead-band DC power generated by the iPSU 300 throughout the power management system. Separately, the twisted pairs of data communication conductors 204 and untwisted data communication conductors 208 are configured to enable data communication the between the iDrivers 100, iSensors 600, iRouters 700, remote i/O modules 800, and the iPSU 300. In particular, the data communication conductors may serve as an Ethernet up link, Ethernet down link, and local communication line, respectively. For example, in one embodiment, instructions from the iPSU to specific iDrivers 100 (e.g., to power on, power off, or dim an LED troffer 5) can be transmitted via the twisted pairs of data communication conductors 204 (or, alternatively, untwisted data communication conductors 208. Additional data communication, such as for the purpose of monitoring the status and performance of the iDrivers 100 and iSensors 600, can also be transmitted along the remaining data communication conductors. In various embodiments, by providing separate, isolated conductors for power and data communication, the power generated by the iPSU 300 can be distributed uninterrupted along the PWE cables 200 to the iDrivers 300. The dedicated power cables in the PWE cable 200 also enable higher wattages to be transmitted over the PWE cable 200 (e.g., in comparison to more limited methods, such as power-over-Ethernet).

Figure 10B:
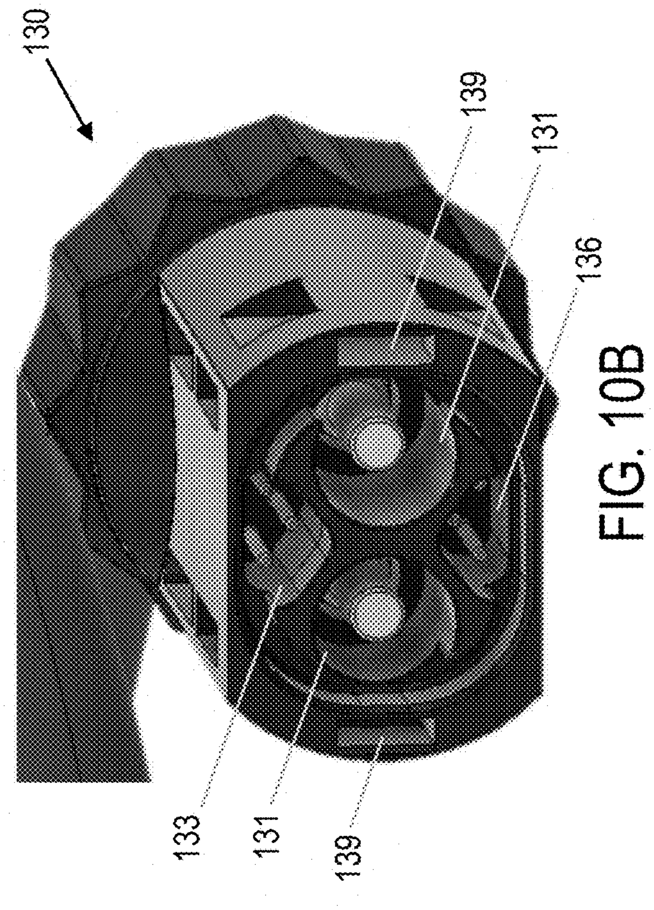
FIGS. 10A and 10B show female and male power-with-Ethernet cable connectors, respectively, according to one embodiment.
Figure 10A:
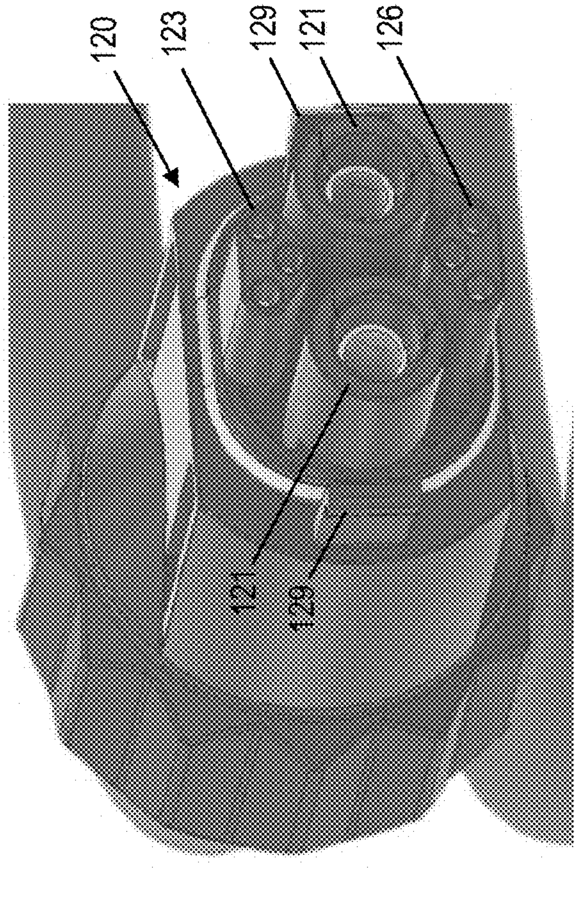

The PWE cable's female and male PWE connectors 120, 130 are shown in FIGS. 10A and 10B according to one embodiment. As shown in FIG. 10A, the female PWE connector 120 includes a pair of power connector protrusions 121, which extend outwardly from the connector and are laterally spaced from one another. According to various embodiments, the power connector protrusions 121 include electrical contacts disposed in a recessed fashion within the protrusions and that are electrically connected to the PWE cable's power cables 202.

The female PWE connector 120 also includes an upper data connector protrusion 123 and a lower data connector protrusion 126. Both the upper and lower data connector protrusions extend outwardly from the connector 120 and are disposed at least partially between the power connector protrusions 121. As shown in FIG. 10A, the upper data connector protrusion 123 includes three electrical contacts disposed in a recessed fashion within the upper data connector protrusion 123. According to various embodiments, two of the upper data connector's electrical contacts are electrically connected to one of the PWE cable's twisted pairs of data communication conductors 204, while the third of the upper data connector's electrical contacts are electrically connected to one of the PWE's cables untwisted data communication conductors 208. In particular, in the illustrated embodiment, the upper data connector protrusion's three electrical contacts are arranged in a triangle, with two of the electrical contacts disposed laterally adjacent to one another and the third electrical contact disposed below and between the first two electrical contacts. Specifically, in the illustrated embodiment, the lower electrical contact is positioned partially between the power connector protrusions 121.

Likewise, the lower data connector protrusion 126 includes three electrical contacts disposed in a recessed fashion within the lower data connector protrusion 126. According to various embodiments, two of the lower data connector's electrical contacts are electrically connected to one of the PWE cable's twisted pairs of data communication conductors 204, while the third of the upper data connector's electrical contacts are electrically connected to one of the PWE's cables untwisted data communication conductors 208. In particular, in the illustrated embodiment, the lower data connector protrusion's three electrical contacts are arranged in a triangle, with two of the electrical contacts disposed laterally adjacent to one another and the third electrical contact disposed above and between the first two electrical contacts. Specifically, in the illustrated embodiment, the upper electrical contact is positioned partially between the power connector protrusions 121.

The female PWE connector 120 also includes a pair of laterally disposed fastener tabs 129. As shown in FIG. 10A, the fastener tabs 129 are generally thin, resilient tabs extending outwardly from lateral sides of the connector, adjacent outer portions of the power connector protrusions 121. As discussed in greater detail below, the fastener tabs 129 are configured to engage the male PWE connector 130 and enable the connectors 120, 130 to be selectively and removably secured to one another.

As shown in FIG. 10B, the male PWE connector 130 includes a pair of power connector cavities 131, which extend inwardly into the connector and are laterally spaced from one another. According to various embodiments, the power connector cavities 131 include protruding electrical contacts disposed centrally within the cavities and that are electrically connected to the PWE cable's power conductors 202. In particular, the power connector cavities 131 are dimensioned to receive the power connector protrusions 121 of the female PWE connector 120 such that the male connectors' power connector electrical contacts are inserted within the female connector's power connector contacts, thereby electrically connecting the power portions of the contacts 120, 130.

The male PWE connector 130 also includes an upper data connector cavity 133 and a lower data connector cavity 136. As shown in FIG. 10B, the upper data connector cavity 133 includes three protruding electrical contacts disposed within the upper data connector cavity 133 and arranged in triangular pattern. According to various embodiments, two of the upper data connector cavity's protruding electrical contacts are electrically connected to one of the PWE cable's twisted pairs of data communication conductors 204, while the third of the upper data connector cavity's electrical contacts are electrically connected to one of the PWE's cables untwisted data communication conductors 208. In particular, the upper data connector cavity 133 is dimensioned to receive the upper data connector protrusion 123 of the female PWE connector 120 such that the male connector's data connector electrical contacts are inserted within the female connector's data connector electrical contacts, thereby connecting the data portions of the contacts 120, 130.

Likewise, the lower data connector cavity 136 includes three protruding electrical contacts disposed within the lower data connector cavity 136 and arranged in triangular pattern. According to various embodiments, two of the lower data connector cavity's protruding electrical contacts are electrically connected to one of the PWE cable's twisted pairs of data communication conductors 204, while the third of the upper data connector cavity's electrical contacts is electrically connected to one of the PWE's cables untwisted data communication conductors 208. In particular, the lower data connector cavity 136 is dimensioned to receive the lower data connector protrusion 126 of the female PWE connector 120 such that the male connector's data connector electrical contacts are inserted within the female connector's data connector electrical contacts, thereby connecting the data portions of the contacts 120, 130.

The male PWE connector 130 also includes a pair of laterally disposed fastener cavities 139. As shown in FIG. 10B, the fastener cavities 139 are positioned adjacent outer portions of the power connector cavities 131. In various embodiments, the fastener cavities 139 are dimensioned to engage the resilient fastener tabs 129 of the female PWE connector 120 when the fastener tabs 129 are inserted within the fastener cavities 139. In this way, the connectors 120, 130 to be selectively and removably secured to one another.

According to various embodiments, based on the design and configuration of the iDrivers 100 and the iPSU 300, the PWE cable 200 may be provided without the twisted pairs of data communication conductors 204 (e.g., in simplified embodiments where the data communication provided by the cables 204 is not necessary).

Referring back to FIG. 2, PWE cables 200 are used to daisy-chain various power management system components together, including the iDrivers 100, iSensors 600, iRouters 700, and remote iO modules 800. In various embodiments, the iDrivers 100 are fixture connected dimmable LED drivers configured to power respective LED troffers 5. The iDrivers 100 modulate current and voltage to drive the LED troffers 5 (e.g., in accordance with commands received from the iSensors 600 or iPSU 300). The iDrivers 100 also protect the LED troffers 5 from voltage or current fluctuations. In one embodiment, each iDriver 100 is configured for driving up to three independent 50 W LED arrays for RGB color or three monochrome fixtures.

Figure 11:
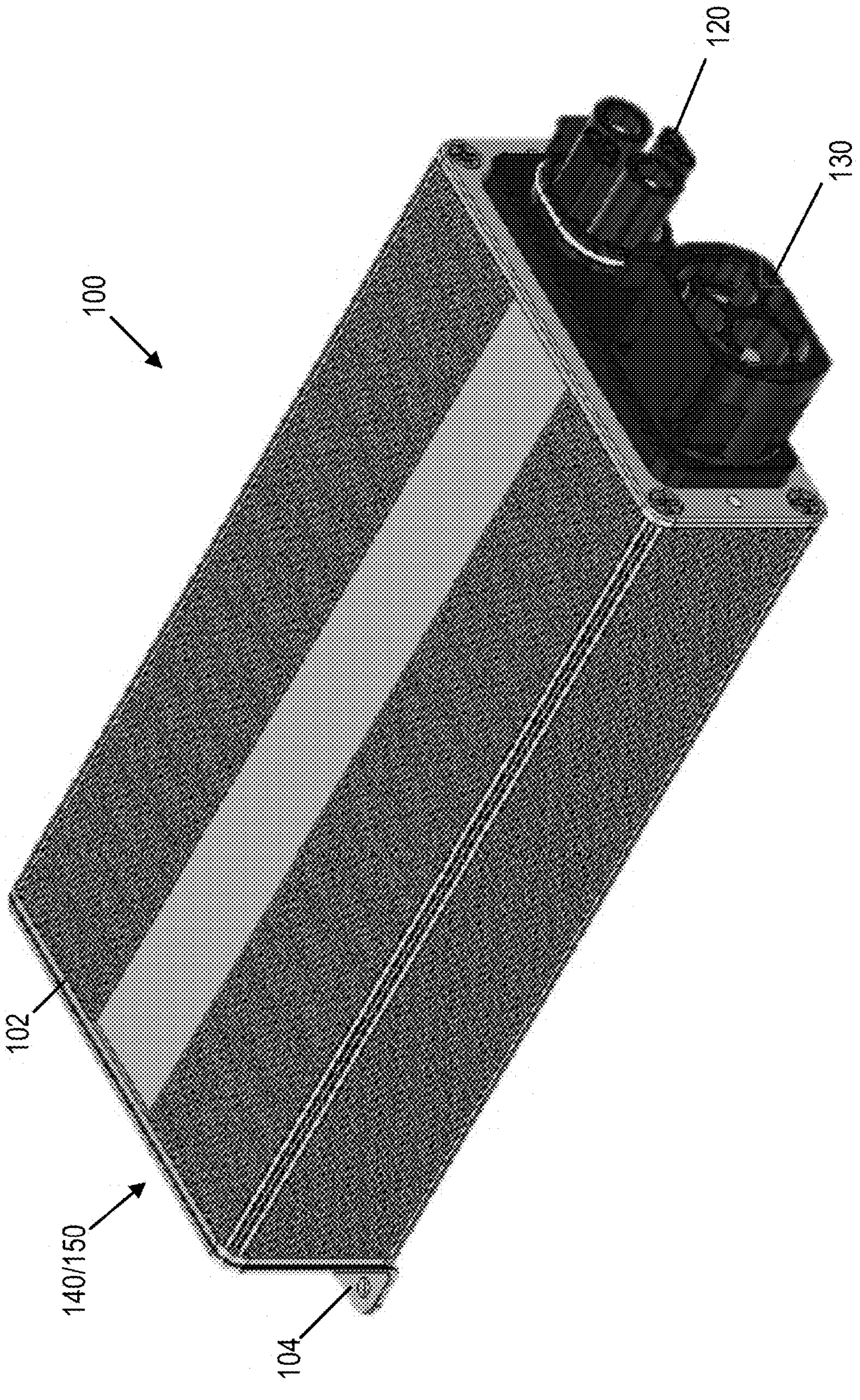
FIG. 11 shows a front-quarter view of an intelligent driver for an LED troffer according to one embodiment.

FIG. 11 illustrates an isometric front quarter view of an iDriver 100 according to one embodiment. As shown in FIG. 11, the iDriver 100 includes a housing 102, within which the iDriver's electronic components are positioned. According to various embodiments, the housing 102 may be constructed from a thermally conductive material (e.g., metals, metal alloys, thermally conductive plastic, a combination of plastics and metals and/or the like). In addition, a mounting bracket 104 is secured to the housing 102. According to various embodiments, the mounting bracket 104 is configured to enable the iDriver 100 to be mounted directly to a lighting fixture (e.g., on the back of a standard lighting fixture) or on another surface proximate to the LED troffer 5.

As shown in FIG. 11, a plurality of electrical connectors are provided on opposite ends of the iDriver's housing 102. At its first end, the iDriver 100 includes a female PWE connector 120 and a male PWE connector 130. According to various embodiments, the female and male PWE connectors 120, 130 are configured to be secured to a power-with-Ethernet cable 200 in order to provide an electrical and data communication connection between the iDrivers 100, iPSU 300, and other system components. For example, in one embodiment, the female PWE connector 120 functions as an electrical and data input, while the male PWE connector 130 functions as an electrical and data output.

Figure 12:
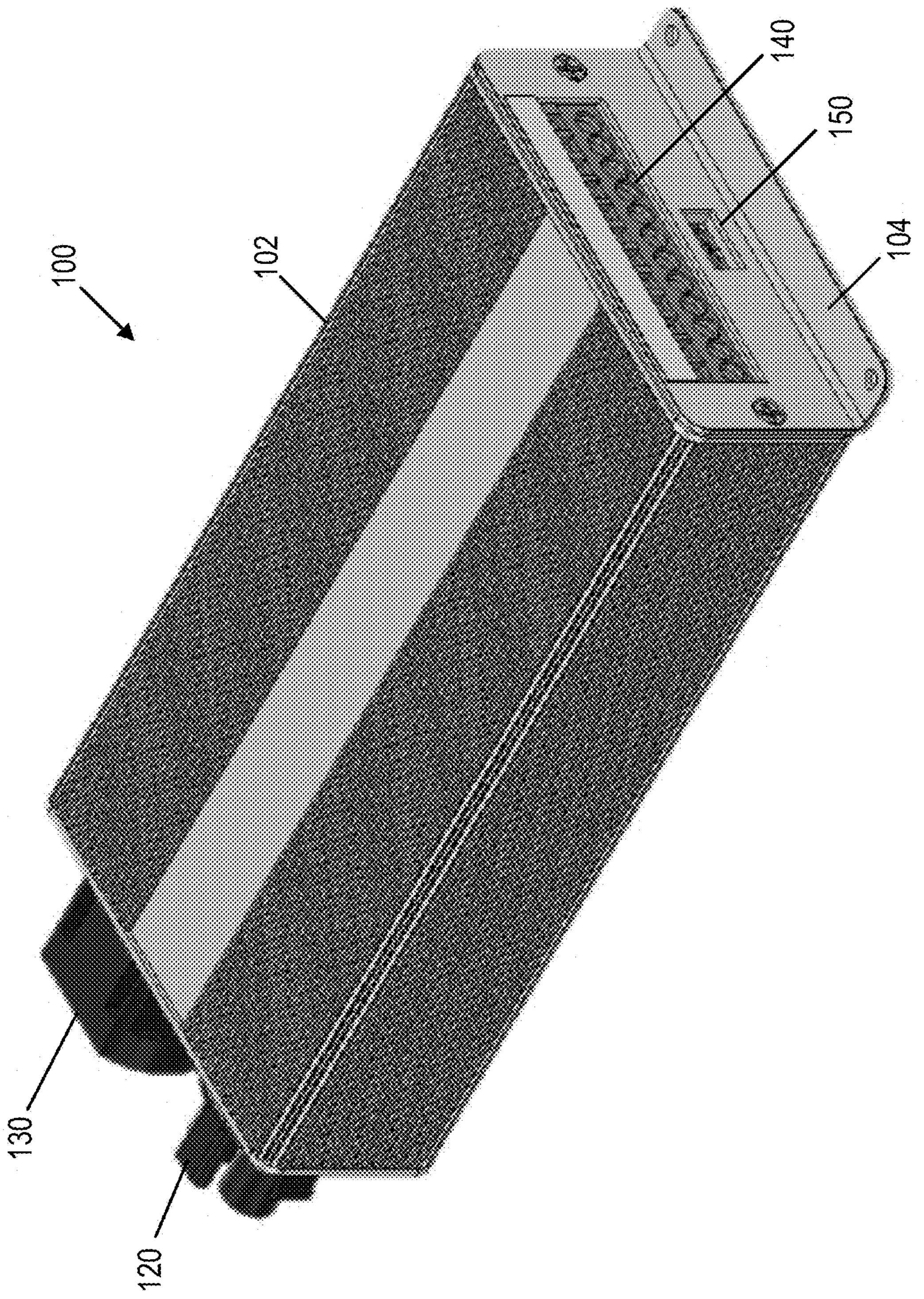
FIG. 12 shows a rear-quarter view of an intelligent driver for an LED troffer according to one embodiment.

FIG. 12 illustrates an isometric rear quarter view of the iDriver 100 according to one embodiment. As shown in FIG. 12, the second end of the iDriver 100 includes an electrical output interface designed facilitate power delivery from the iDriver 100 to an LED troffer 5 (e.g., via cables 7 shown in FIG. 2). In addition, the second end of the iDriver 100 includes a USB port 150, which enables various sensors and control devices to be plugged directly into the iDriver 100 (e.g., a dimmer switch or temperature sensor). In various embodiments, each iDriver 100 is also controllable via authorized Internet connected devices, including smart phones, tablets, and PCs, and is fully US plenum rated.

The iDrivers 100 are each configured to be daisy chained to one another—and to the iPSU 300 and other system components—by the PWE cables 200. Via the PWE cables 200, each iDriver 100 receives power and data communications. By daisy chaining the iDrivers 100 using PWE cables 200 (e.g., as shown in FIG. 2) installation and maintenance of the power management system is greatly improved. For example, because a large number of iDrivers 100 can be daisy-chained together, it is not necessary for each iDriver 100 to be individually wired back to a central switch. This reduces the amount of cabling needed to integrate the various system components and improves flexibility in installing the system. For example, the iPSU 300 can be more flexibly located, because proximity to every iDriver 100 is not necessary.

Figure 14:
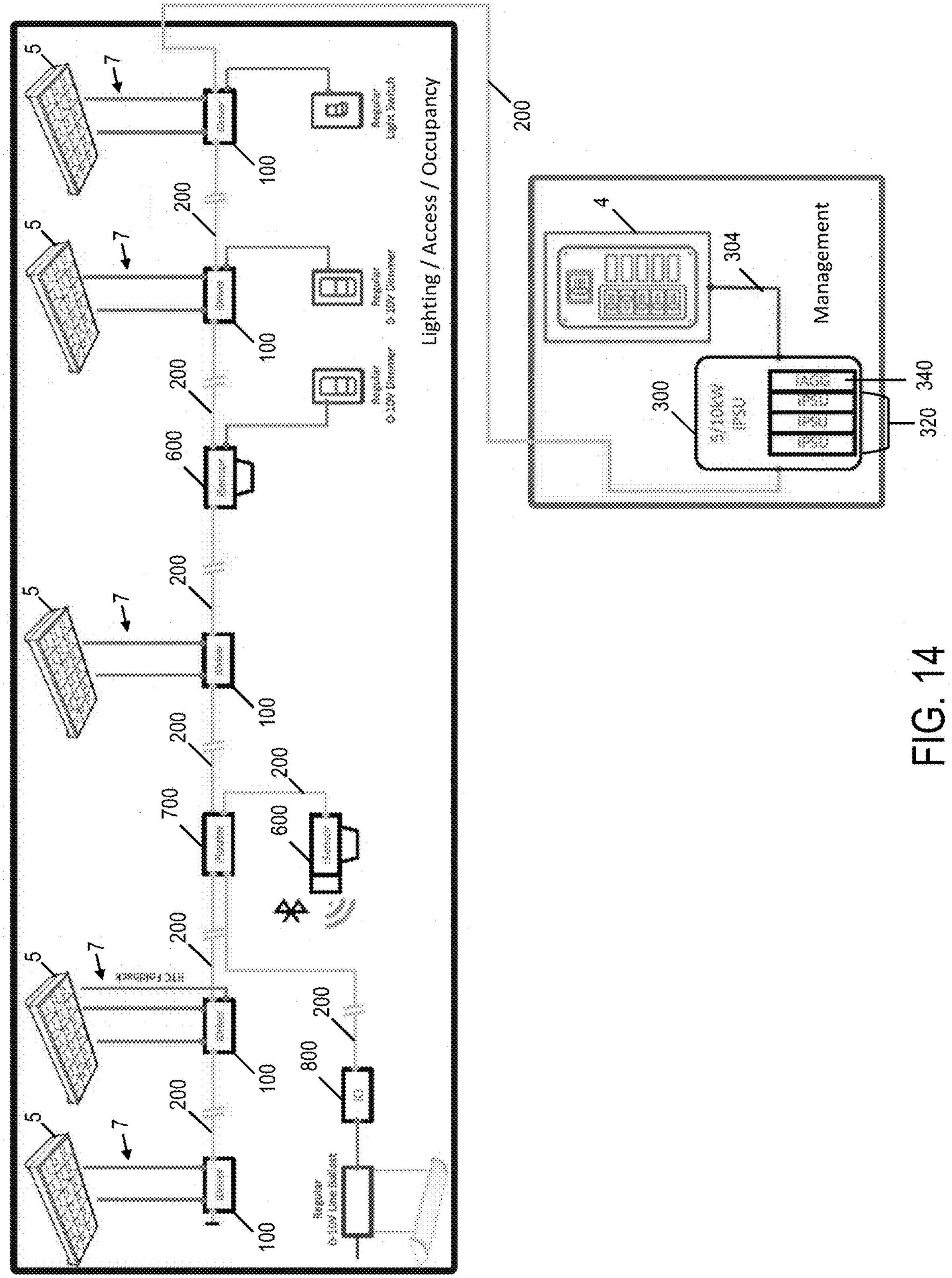
FIG. 14 shows a schematic diagram of a power management system for LED lighting according to another embodiment.

In the illustrated embodiment of FIG. 2, the iDrivers 100 are provided with a power-ring architecture, in which the iDrivers 100 are connected by PWE cables 200 as part of a continuous ring beginning and ending at the iPSU 300. In this configuration, the power management system has improved resistance to system vulnerabilities. As an example, a fault or break at one point in the daisy-chain ring can be circumvented by communication with a particular iDriver around the opposite side of the ring. This enables the system to continue operating properly with a break in the daisy chain, including during maintenance of a particular iDriver 100 or LED troffer 5. However, according to various other embodiments, the iDrivers 100 and other system components may be daisy chained together along one or more strings, without a full ring architecture. As an example, FIG. 14 illustrates a schematic diagram of a power management system having this alternative architecture.

According to various embodiments, the iDrivers 100 are addressable via a DHCP protocol executed by the iPSU 300. As a result, the iPSU 300 can transmit instructions and other data to specific iDrivers 100 along the PWE daisy chain, bypassing iDrivers for which the communication is not intended. In other words, communications to a respective iDriver 100 from the iPSU 300 or other system components are received only by the iDriver 100 to which they are addressed. The ability to automatically address each iDriver 100 also improves the ease with which the power management system can be installed.

In various embodiments, each iDrivers 100 is also configured to automatically detect a load from the LED troffer 5 to which it is connected. For example, in various embodiments the iDriver 100 is configured to automatically measure the forward voltage on output and measure how many LEDs are in its respective drive chain. The iDriver 100 then optimizes voltage based on the output needs. Because the load applied to the iDriver 100 may vary based on the size and output of the LED troffer 5, the ability to auto-detect a load from an LED troffer 5 enables each iDriver 100 to be used for a variety of LED troffer 5 loads. This reduces the number of unique components needed in the system and further improving the ease of installation.

As the iDrivers 100 are daisy chained together along lengths of PWE cable 200, iDrivers 100 positioned further along the daisy chain from the iPSU 300 may experience a slight voltage drop. To compensate for this, each iDriver 100 is configured with a boost function. In particular, the iDriver 100 is configured to detect a reduction in line voltage and step up the voltage to a desired level to appropriate drive the LED troffer 5.

To enable easy control of the iDrivers 100 and LED troffers 5, intelligent sensors (iSensors) 600 are distributed throughout the power management system and connected to the iDrivers (e.g., via PWE cables 200). According to various embodiments, the iSensors 600 are each input-output modules configured for interfacing and powering a wide variety of regular room and occupancy sensors, thereby enabling a wide array of lighting control options. As examples, the iSensors 600 can be configured to interface with conventional room controls and switches (e.g., dimmer switches), remote FOB devices, or other mobile-devices (e.g., phones running lighting control applications). Moreover, the iSensors 600 may themselves be provided with presence sensors (e.g., to turn on lighting upon detection of motion), light level sensors (e.g., to control the output of LED troffers 5 in response to the level of natural light available in the room), and/or temperature sensors. In various embodiments, the iSensors 600 may include both wireless internet and Bluetooth communication devices.

Figure 13:
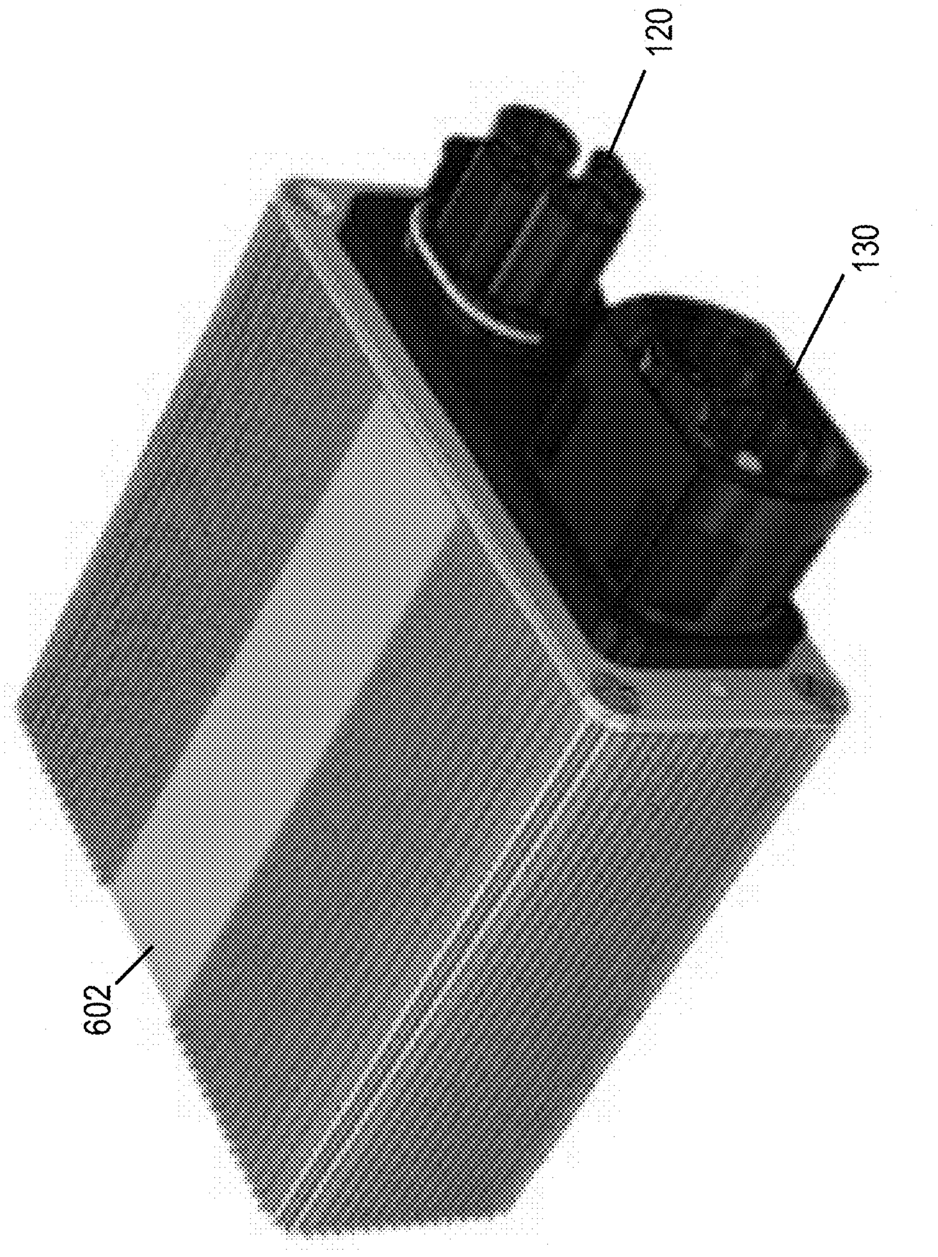
FIG. 13 shows a universal housing according to one embodiment.

FIG. 13 illustrates an iSensor 600 according to one embodiment. In the illustrated embodiment, the iSensor comprises a universal housing 602, which encloses the iSensors' various internal electronics. As shown in FIG. 13, the universal housing 602 includes both female and male PWE connectors 120, 130. Through the PWE connectors 120, 130, the iSensors 600 maybe connected via PWE cables 200 to the various system iDrivers 100, thereby enabling direct data communication and control between the iSensors 600, iDrivers 100, and iPSU 300. According to various embodiments, the aforementioned presence, light-level, and temperature sensors may be embedded in the iSensor's housing 602 or connected via a USB connection (or the liked) provided on the iSensor housing 602.

The power management system shown in FIG. 2 also includes a plurality of intelligent router modules (iRouters) 700. According to various embodiments, the iRouters 700 are each communication modules that provide segmentation of IP traffic within the power management system. In particular, the iRouters 700 can be configured for segmenting the deadband DC power networks and integrating other CAT-5 Ethernet devices. Moreover, in various embodiments, the iRouters 700 can be used to enable enhanced segmenting for security and can be configured for fully encrypted communication. According to various embodiments, the iRouters 700 can be provided in the same universal housing 602 used for the iSensors 600. As a result, the iRouters 700 are provided with the same PWE connectors 120, 130 for communication throughout the network over PWE cables 200.

As an example, as shown in FIG. 2, an iRouters 700 is provided to segment the iDriver string from a regular line powered pendant (e.g., 0-10V line ballast). In addition, a remote iO module 800 is provided to enable remote control of the pendant. According to various embodiments, iO modules 800 can be implemented throughout the power management system to provide remote control of regular line based drivers and ballasts, as well as other lighting controls. Moreover, the remote iO modules 800 can also be provided in the same universal housing 602 used for the iSensors 600. As a result, the remote iO modules 800 are also provided with the same PWE connectors 120, 130 for communication throughout the network over PWE cables 200.

Figure 15:
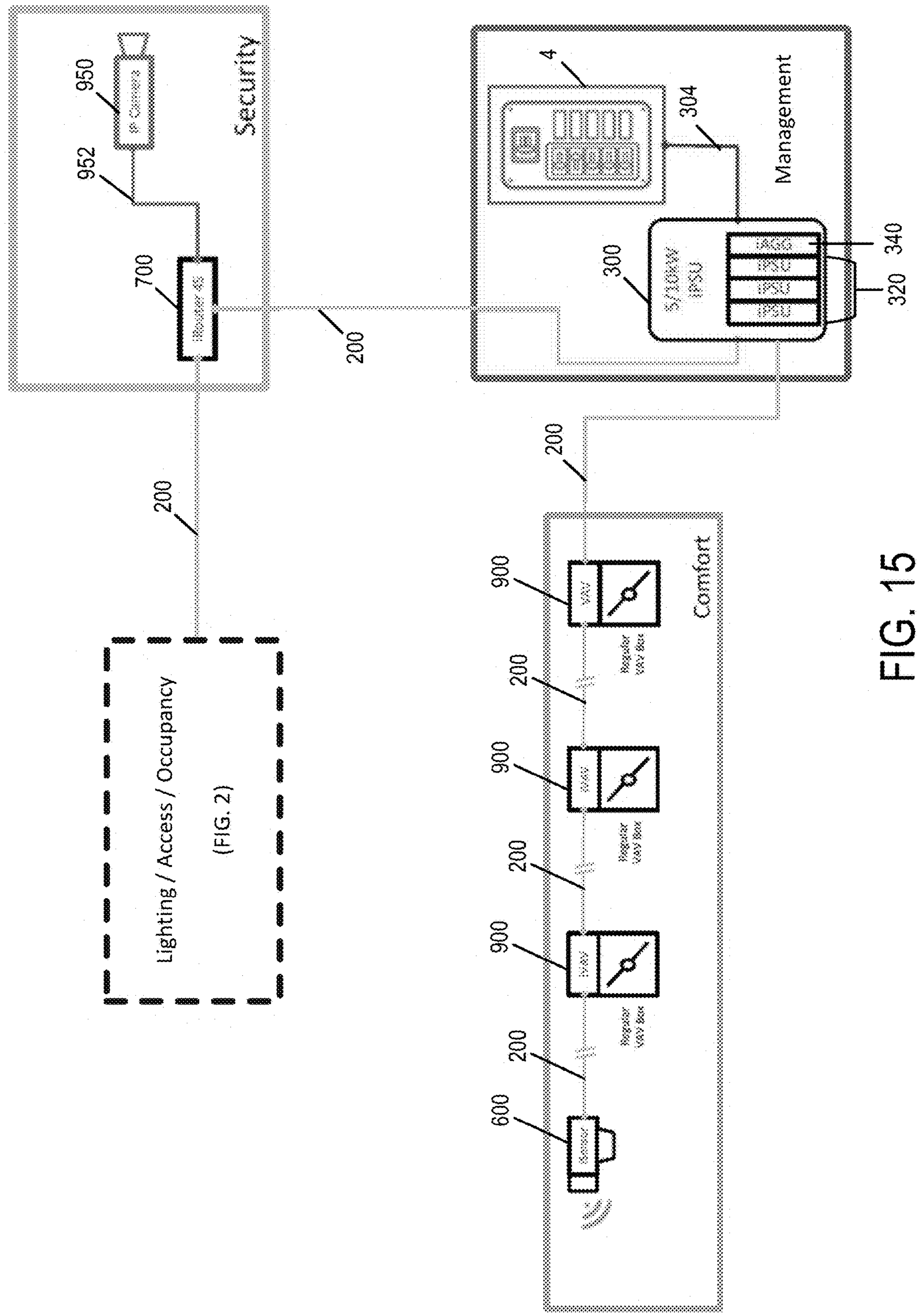
FIG. 15 shows a schematic diagram of a power management system with integrated security and comfort features according to one embodiment.

According to various embodiments, the power management system disclosed herein can also be integrated with various non-lighting features within a building environment. As an example, FIG. 15 shows a schematic diagram in which the power management system of FIG. 2 (depicted partially by the dashed Lighting/Access/Occupancy box) is further integrated with a security system and comfort system. In particular, as shown in FIG. 15, an iRouter 700 is used to interface the PWE daisy chain 200 with an IP security camera 950. In the illustrated embodiment, the security camera 950 is connected to the iRouter 700 via a Cat 5 cable 952. As noted above, the iRouter 700 is able to segment the security camera 950 from the rest of the network, while still providing power to the camera 952 from the iPSU 300.

In addition, the power management system depicted in FIG. 15 includes a plurality of variable air volume iO modules (iVAV) 900. According to various embodiments, the iVAVs 900 are dedicated iO modules aimed at a VAV box actuator interfacing. As shown in FIG. 15, the iVAVs 900 are powered via PWE cables 200 and controlled via an iSensor 600. As a result, the iVAVs 900 enable integrated HVAC control as part of the power management system.

While this specification contains many specific embodiment details, these should not be construed as limitations on the scope of any inventions described herein, but rather as descriptions of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations, one or more features from a combination can in some cases be excised from the combination, and the combination may be directed to a sub-combination or variation of a sub-combination.

Moreover, many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the application.

That which is claimed:

1. A method of powering a lighted environment, the method comprising:

receiving, at a power supply unit, an AC power signal;

converting the AC power signal into a converted power signal, wherein the converted power signal comprises a deadband DC waveform including periods of zero voltage between the waveform's peaks;

receiving the converted power signal generated by the power supply unit at a plurality of driver units;

sending one or more instructional signals from an aggregator module to at least one driver unit of the plurality of driver units by operating a dynamic host configuration protocol for the plurality of driver units; and powering, by the plurality of driver units and with the converted power signal received at the plurality of driver units, at least one of a plurality of lighting units.

2. The method of claim 1, wherein the deadband DC waveform comprises a rectified sinewave.

3. The method of claim 1, wherein each of the plurality of lighting units comprise an LED troffer.

4. The method of claim 3, wherein each of the plurality of driver units comprises a fixture-connected dimmable LED driver configured for modulating current and voltage to drive at least one LED troffer.

5. The method of claim 1, further comprising automatically detecting, via one or more of the plurality of driver units, a load from a respective lighting unit by measuring a forward voltage; and optimizing a voltage output based on the detected load.

6. The method of claim 1, further comprising detecting, via one or more of the plurality of driver units, a reduction in line voltage; and, in response to detecting the reduction in the line voltage, stepping-up a voltage output to a desired level.

7. The method of claim 1, wherein the aggregator module is configured for controlling operation of the power supply unit.

8. The method of claim 1, wherein the at least one aggregator module is further configured to send data to and receive data from the plurality of driver units.

9. The method of claim 1, wherein the plurality of driver units are electrically connected to the power supply a continuous ring beginning and ending at the power supply unit.

10. The method of claim 1, wherein the AC power signal is received by the power supply unit at one or more power modules, the one or more power modules being configured to convert the AC power signal into the converted power signal.

11. The method of claim 10, further comprising selectively engaging the one or more power modules with an internal bus bar provided in the power supply unit, wherein the one or more power modules are removable from the power supply unit.

12. The method of claim 1, wherein the plurality of driver units are daisy-chained to one another by a plurality of cables.

13. The method of claim 12, wherein the plurality of cables comprise power-with-ethernet cables.

14. The method of claim 13, wherein the power-with-ethernet cables each comprise one or more power conductors and one or more separate data communication conductors packaged together within a protective wrap.

15. The method of claim 1, further comprising receiving a control device at a USB-port defined by one or more of the plurality of driver units.

16. The method of claim 1, further comprising transmitting one or more communications from a plurality of sensor units to at least one of the plurality of driver units, the plurality of sensor units being configured for interfacing with one or more room or occupancy controls.

* * * * *